(12) United States Patent
Kondo et al.

(10) Patent No.: US 8,310,409 B2
(45) Date of Patent: Nov. 13, 2012

(54) DISPLAY DEVICE AND DISPLAY METHOD

(75) Inventors: Tetsujiro Kondo, Tokyo (JP); Yuji Okumura, Kanagawa (JP); Tsugihiko Haga, Tokyo (JP); Tetsuya Murakami, Chiba (JP); Kenji Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 197 days.

(21) Appl. No.: 10/485,635

(22) PCT Filed: Jun. 5, 2003

(86) PCT No.: PCT/JP03/07100
§ 371 (c)(1),
(2), (4) Date: Sep. 16, 2004

(87) PCT Pub. No.: WO03/104891
PCT Pub. Date: Dec. 18, 2003

(65) Prior Publication Data
US 2006/0152435 A1  Jul. 13, 2006

(30) Foreign Application Priority Data
Jun. 5, 2002  (JP) ................... 2002-163682

(51) Int. Cl.
*G09G 3/00* (2006.01)
(52) U.S. Cl. ................ 345/32; 353/7; 353/10; 359/458; 359/478
(58) Field of Classification Search ............... 359/74, 359/458–479; 345/30, 32; 353/7, 10
See application file for complete search history.

(56) References Cited

U.S. PATENT DOCUMENTS

| | | | | |
|---|---|---|---|---|
| 4,853,769 A * | 8/1989 | Kollin | ............... | 348/54 |
| 4,868,682 A | 9/1989 | Shimizu et al. | | |
| 5,537,251 A | 7/1996 | Shimada | | |
| 5,678,910 A * | 10/1997 | Martin | ............... | 353/7 |
| 5,854,706 A * | 12/1998 | Alb | ............... | 359/465 |
| 6,183,088 B1 * | 2/2001 | LoRe et al. | ............... | 353/7 |
| 6,487,020 B1 | 11/2002 | Favalora | | |
| 6,561,649 B1 | 5/2003 | Burstyn | | |
| 2001/0017688 A1 * | 8/2001 | Inoue et al. | ............... | 353/74 |
| 2001/0048405 A1 | 12/2001 | Salley | | |
| 2002/0145660 A1 * | 10/2002 | Kanade et al. | ............... | 348/36 |

FOREIGN PATENT DOCUMENTS

| | | |
|---|---|---|
| JP | 5-341411 | 12/1993 |
| JP | 6-273693 | 9/1994 |
| JP | 2001 356410 | 12/2001 |
| JP | 2002-112094 | 4/2002 |
| JP | 2002-525686 | 8/2002 |

(Continued)

*Primary Examiner* — Seokyun Moon
(74) *Attorney, Agent, or Firm* — Frommer Lawrence & Haug LLP; William S. Frommer; Ellen Marcie Emas

(57) ABSTRACT

The present invention relates to a display apparatus and a display method that enable multiple users to view high resolution moving images from various viewing points of the users. A light-control screen 25 is rotated, and projectors $21_1$ to $21_N$ irradiate the screen 25 from various directions with light rays corresponding to image data captured from those directions. In this case, when the forward direction of the light-control screen 25 is aligned with the projecting direction of one of the projectors $21_n$, an image corresponding to light rays emitted from the projector $21_n$ is displayed on the light-control screen 25. The present invention may be applied to a display apparatus for displaying images.

15 Claims, 28 Drawing Sheets

FOREIGN PATENT DOCUMENTS

| | | |
|---|---|---|
| WO | WO 92 02845 | 2/1992 |
| WO | WO 97 10523 | 3/1997 |
| WO | WO 00/17844 | 3/2000 |
| WO | WO 01 05147 | 1/2001 |
| WO | WO 01/80204 | 10/2001 |
| WO | WO 02 21851 A2 | 3/2002 |
| WO | WO 02 21851 A3 | 3/2002 |

* cited by examiner

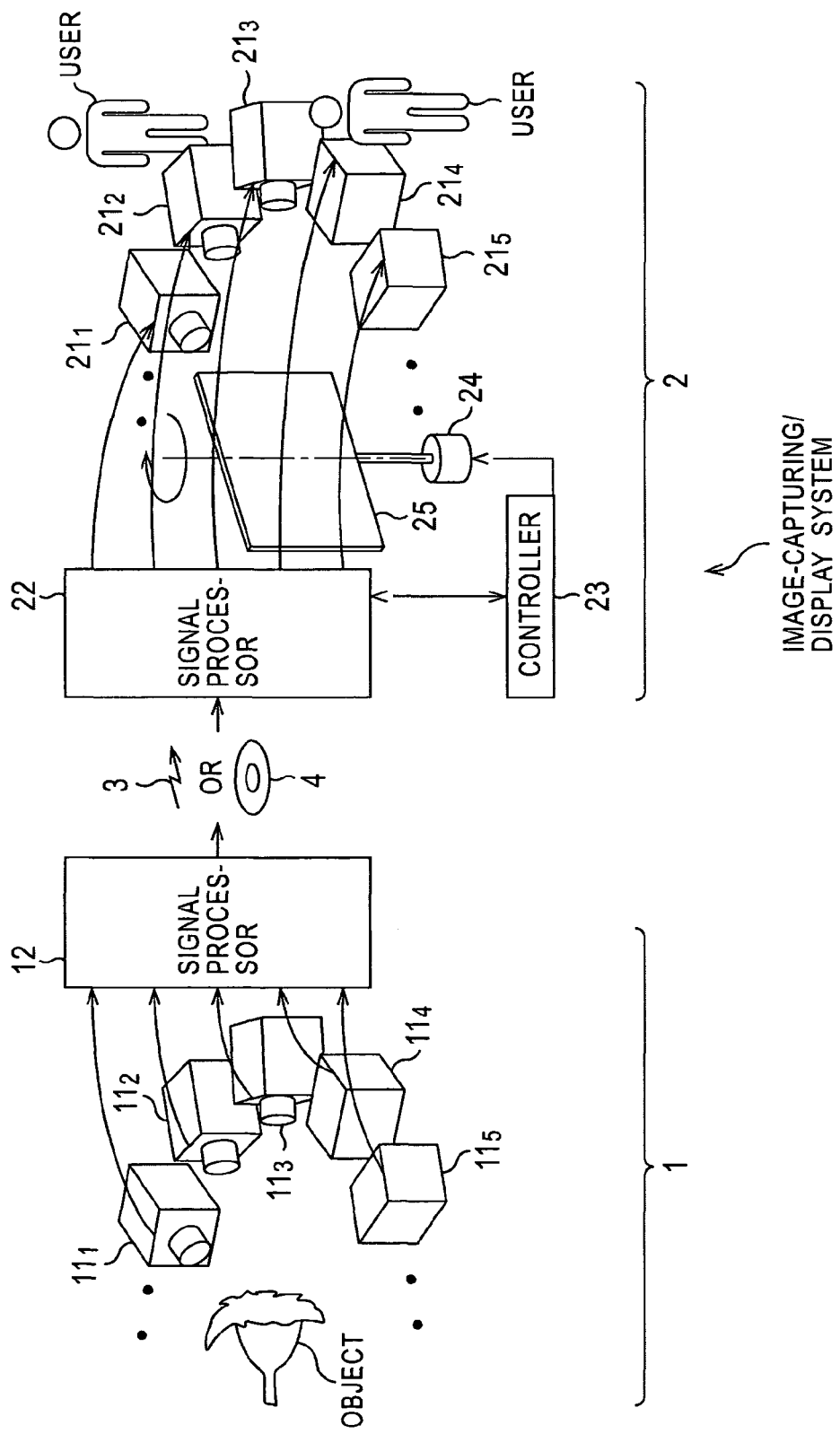

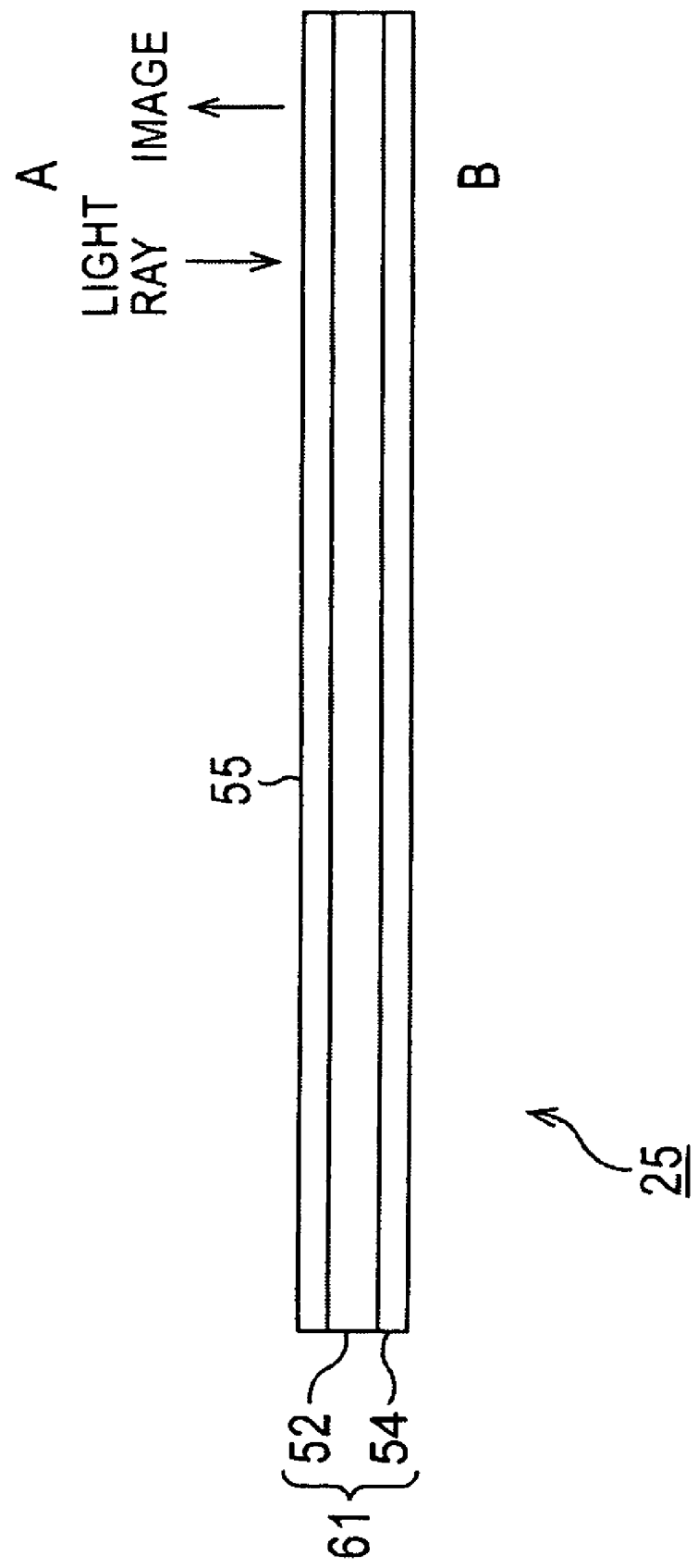

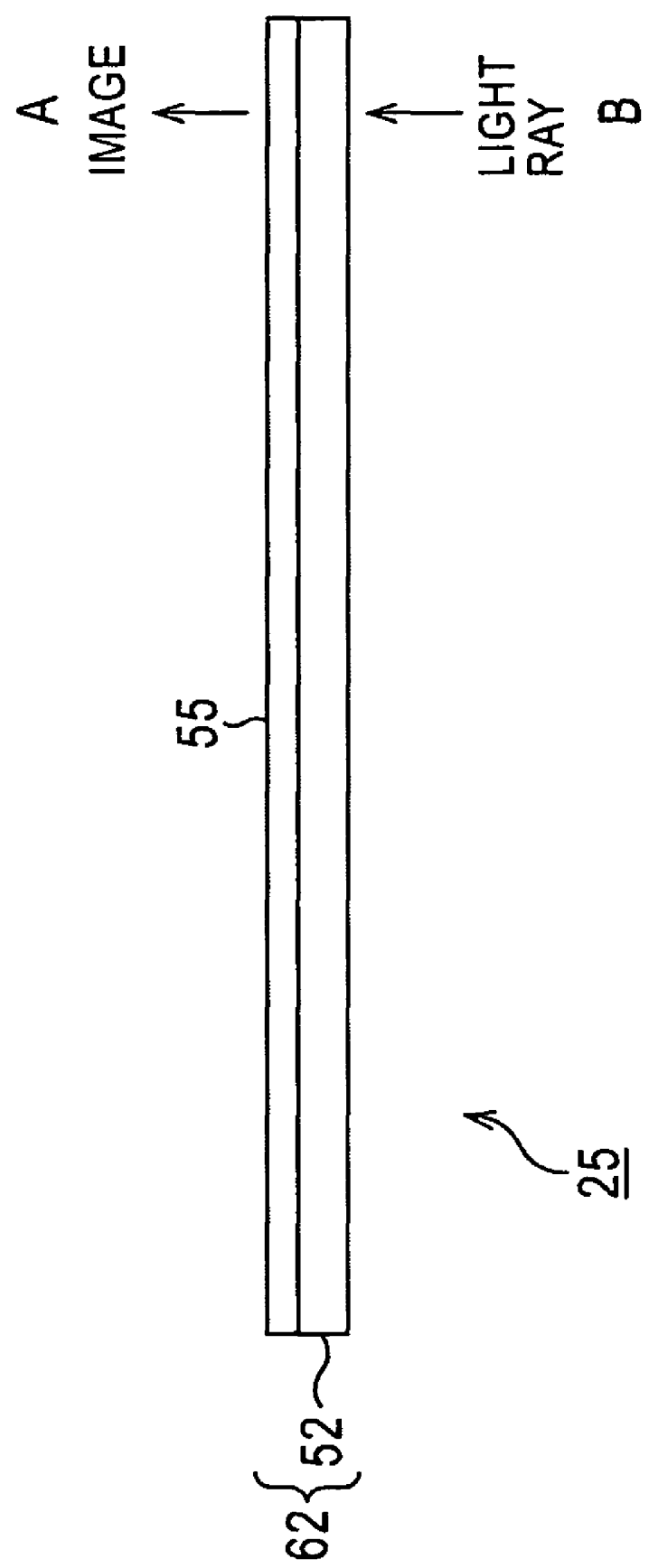

DISPLAY DEVICE AND DISPLAY METHOD

TECHNICAL FIELD

The present invention relates to display apparatuses and display methods, and particularly, to a display apparatus and a display method that allow multiple users to view high-resolution moving images from the users' individual viewing points.

BACKGROUND ART

One known 3D display system that presents images viewable from various viewing points of multiple users is, for example, the Integral Photography (IP) 3D-image system developed by NHK (Japan Broadcasting Corporation).

FIG. 1 illustrates an example of the IP 3D-image system.

In the IP 3D-image system, a camera (video camera) 202 captures an image of an object through a lens array 201.

As shown in FIG. 2A in plan view and FIG. 2B in cross-sectional view, the lens array 201 has multiple microlenses disposed in a plane. The camera 202 captures the image of the object through each of the lenses.

In the IP 3D-image system, a display apparatus 203, such as a liquid crystal display, displays the image captured by the camera 202. A lens array 204 is disposed over the front face of a display screen of the display apparatus 203. The lens array 204 has the same structure as the lens array 201. A user sees the image displayed on the display apparatus 203 through the lens array 204. Thus, the user is able to view the image of the object of a certain viewing point.

This means that the image captured by the camera 202 is a combination of image elements (referred to as microlens image-elements hereinafter) of the object seen through the microlenses of the lens array 201. Thus, the image displayed on the display apparatus 203 is a combination of the microlens image-elements. The combination of the microlens image-elements is viewed from a certain viewing point through the lens array 204 having the same structure as the lens array 201. The image of the object seen from that viewing point is therefore formed of pixels which are formed of the microlens image-elements seen through the microlenses of the lens array 204.

Accordingly, the IP 3D-image system presents images that can be viewed from various viewing points of multiple users.

To briefly (or theoretically) describe the IP 3D-image system, an image of an object seen from a certain viewing point is formed of pixels that are formed by combining microlens image-elements of the microlenses of the lens array 204.

This means that the image resolution presented to a user depends on properties and density of the microlenses of the lens arrays 201 and 204. However, there are limits to reducing the size of the microlenses and also to the number of the microlenses, thus leading to difficulties in providing users with images having high resolution.

Another 3D display system that presents images viewable from various viewing points of multiple users is, for example, Zebra Imaging developed by Zebra Imaging, Inc.

Zebra Imaging uses holography technology to present high-resolution images that can be viewed from various viewing points of multiple users. However, because the images displayed using Zebra Imaging are holograms, the production of the images requires many hours for calculation, thus leading to difficulties in displaying moving images.

DISCLOSURE OF INVENTION

In view of these circumstances, the present invention enables multiple users to view high-resolution moving images from various viewing points of the users.

A first display apparatus of the present invention includes a screen which receives light rays to display images corresponding to the light rays, driving means for rotating the screen around or on a predetermined rotational axis thereof, and irradiating means for irradiating the screen with the light rays corresponding to the images from various directions.

A first display method of the present invention includes the steps of rotating a screen around or on a predetermined rotational axis thereof such that the screen receives light rays to display images corresponding to the light rays, and irradiating the screen with the light rays corresponding to the images from various directions.

A second display apparatus of the present invention includes a diffusing plate that receives and diffuses light rays to display images corresponding to the light rays, and at least one optical filter that transmits only a portion of the light rays diffused by the diffusing plate, the portion of the light rays traveling in a predetermined direction.

A second display method of the present invention includes the steps of displaying images corresponding to light rays that are received and diffused by a diffusing plate for diffusing received light rays, and transmitting only a portion of the light rays diffused by the diffusing plate, the portion of the light rays traveling in a predetermined direction.

In the first display apparatus and the first display method of the present invention, the screen that receives light rays to display images corresponding to the light rays is rotated around or on the predetermined rotational axis of the screen so that the screen is irradiated with the light rays corresponding to the images from various directions.

In the second display apparatus and the second display method of the present invention, only a portion of the light rays diffused by the diffusing plate for diffusing received light rays is transmitted to display images corresponding to the light rays, the portion of the light rays traveling in a predetermined direction.

BRIEF DESCRIPTION OF THE DRAWINGS

FIG. 3 illustrates a first embodiment of an image-capturing/display system employing the present invention;

FIG. 12 is a cross-sectional view of a second configuration of the light-control screen 25;

FIG. 13 is a cross-sectional view of a third configuration of the light-control screen 25;

BEST MODE FOR CARRYING OUT THE INVENTION

FIG. 3 illustrates a first embodiment of an image-capturing/display system employing the present invention. (The term "system" is referred to as a product having multiple apparatuses orderly assembled together, meaning that the apparatuses do not necessarily need to be disposed within the same housing.)

The image-capturing/display system includes an image-capturing apparatus 1 and a display apparatus 2.

The image-capturing apparatus 1 captures images of an object and transmits the obtained image data via a transmission medium 3 such as terrestrial broadcast waves, a satellite connection, a cable television (CATV) network, a telephone line, and the Internet. Alternatively, the image data may be recorded onto a recording medium 4 such as a semiconductor memory, an optical disc, and a magnetic disc.

The display apparatus 2 receives the image data sent through the transmission medium 3 or the image data played back from the recording medium 4 to display the image data.

Figure 1:
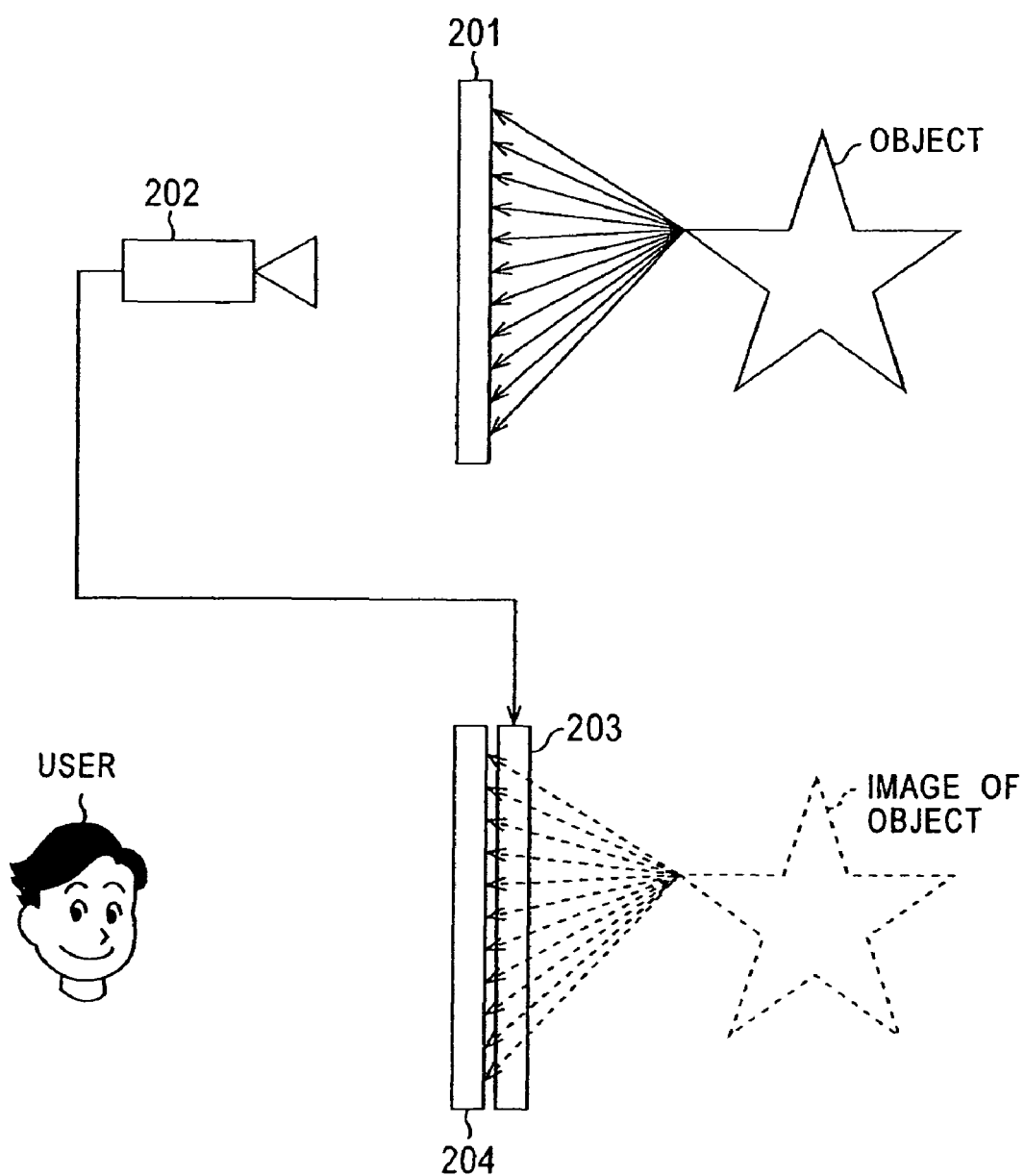
FIG. 1 illustrates an example of an IP 3D-image system.
Figure 2A:
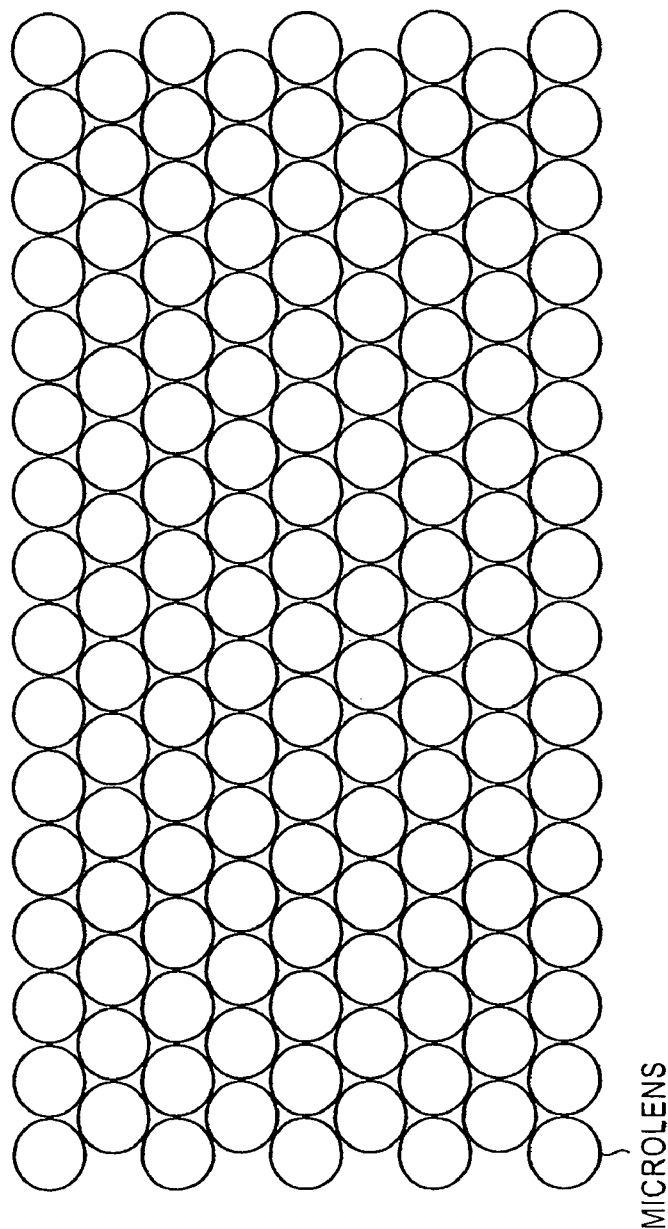
FIG. 2A is a plan view of a lens array 201 and a lens array 204.
Figure 2B:
FIG. 2B is a cross-sectional view of the lens array 201 and the lens array 204.
Figure 4:
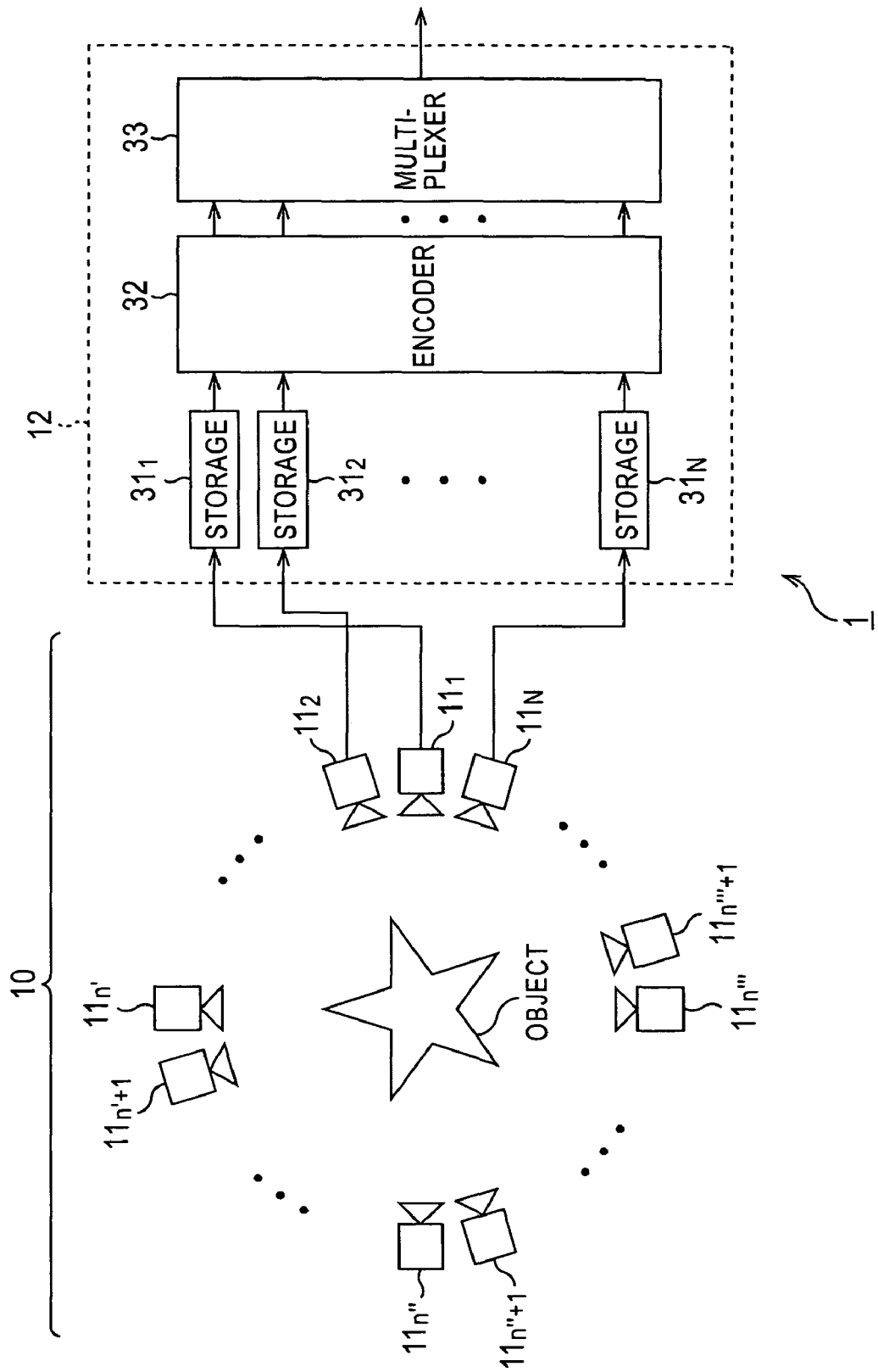
FIG. 4 is a block diagram of an image-capturing apparatus 1.

FIG. 4 illustrates the image-capturing apparatus 1 of FIG. 3.

The image-capturing apparatus 1 includes an optical image-capturing device 10 and a signal processor 12.

The optical image-capturing device 10 includes N cameras $11_1$ to $11_N$. The N cameras $11_1$ to $11_N$ are disposed at, for example, regular intervals (at equal angles) horizontally around the 360° periphery of the object. Furthermore, the N cameras $11_1$ to $11_N$ are disposed in a state such that optical axes of the cameras, for example, are in the same horizontal plane and converge at one point in that horizontal plane. The positioning of the N cameras $11_1$ to $11_N$ is not limited to the description above. The N cameras $11_1$ to $11_N$ may be disposed at, for example, uneven intervals.

Each of the cameras $11_n$ (n=1, 2, ..., N) captures an image of the object. In other words, each camera $11_n$ receives light from the object and performs photoelectric conversion so as to obtain image data of the object. Each of the obtained image data is supplied to the signal processor 12 in, for example, frame units (or field units).

The signal processor 12 includes storage $31_1$ to $31_N$, an encoder 32, and a multiplexer 33. The number of storages $31_1$ to $31_N$ provided is equal to the number of cameras $11_1$ to $11_N$. The signal processor 12 processes the image data supplied from the cameras $11_n$ and then outputs the data.

Each of the storages $31_n$ temporarily stores the image data supplied from the corresponding one of the cameras $11_n$. The encoder 32 reads out the image data from each of the storages $31_1$ to $31_N$ and performs compression-encoding on each data by a predetermined process such as a digital video (DV) process. The encoder 32 supplies the encoded data obtained by the compression-encoding of the image data to the multiplexer 33. The encoded data, which are supplied from the encoder 32 and correspond to the image data captured by each of the N cameras $11_1$ to $11_N$, are multiplexed to form one data stream by the multiplexer 33. The data stream is then transmitted via the transmission medium 3 (see FIG. 3) or is supplied to the recording medium 4 (see FIG. 3) to be recorded thereon.

Figure 5:
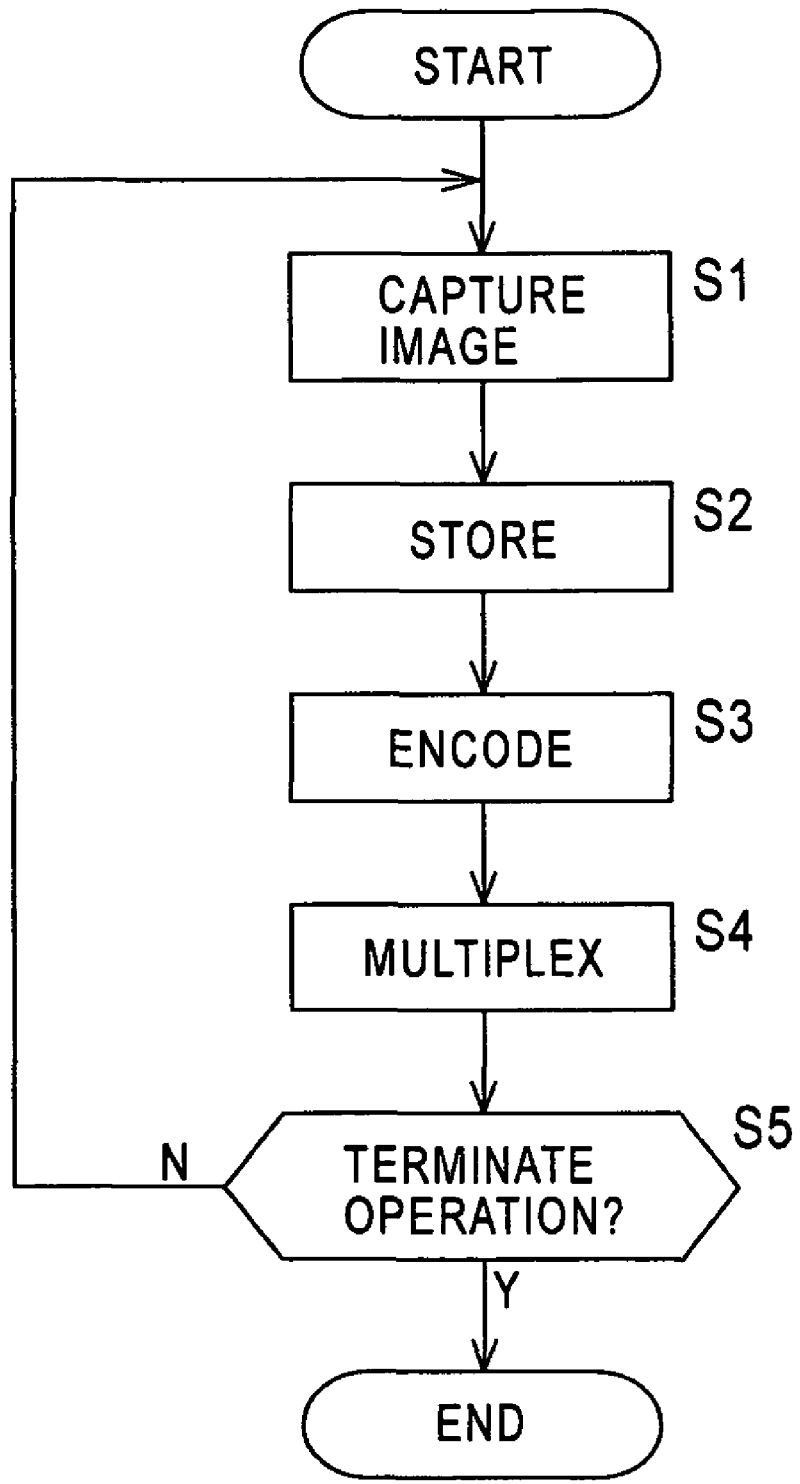
FIG. 5 illustrates a flow chart describing the operation of the image-capturing apparatus 1.

Referring to the flow chart of FIG. 5, the operation of the image-capturing apparatus 1 of FIG. 4 will now be described.

In step S1, each camera $11_n$ captures an image of the object and supplies the obtained image data of one frame to a corresponding storage $31_n$ of the signal processor 12. Step S1 then proceeds to step S2. In step S2, each storage $31_n$ stores the image data supplied from the corresponding camera $11_n$. Step S2 then proceeds to step S3. In step S3, the encoder 32 reads out the image data stored in each storage $31_n$ and encodes the data. The encoded data obtained are then supplied to the multiplexer 33.

In step S4, the encoded data, which are supplied from the encoder 32 and correspond to the image data captured by each of the N cameras $11_1$ to $11_N$, are multiplexed to form one data stream by the multiplexer 33. The data stream is then output from the multiplexer 33. The data stream output from the multiplexer 33 is transmitted via the transmission medium 3 (see FIG. 3) or is supplied to the recording medium 4 (see FIG. 3) to be recorded thereon.

In step S5, it is determined whether an operating unit, which is not shown in the drawings, is operated by a user to terminate the image-capturing of the image data (referred to as image-capture termination hereinafter).

If it is determined that the image-capture termination is not performed in step S5, step S5 then returns to step S1 so that the same steps are repeated over again.

On the other hand, if it is determined that the image-capture termination is performed in step S5, the operation ends.

As described above, in the image-capturing apparatus 1, the N cameras $11_1$ to $11_N$ capture images of the object from N viewing points surrounding the object. In other words, the cameras $11_1$ to $11_N$ capture a series of continuous images as seen horizontally from the 360° periphery of the object.

Figure 6:
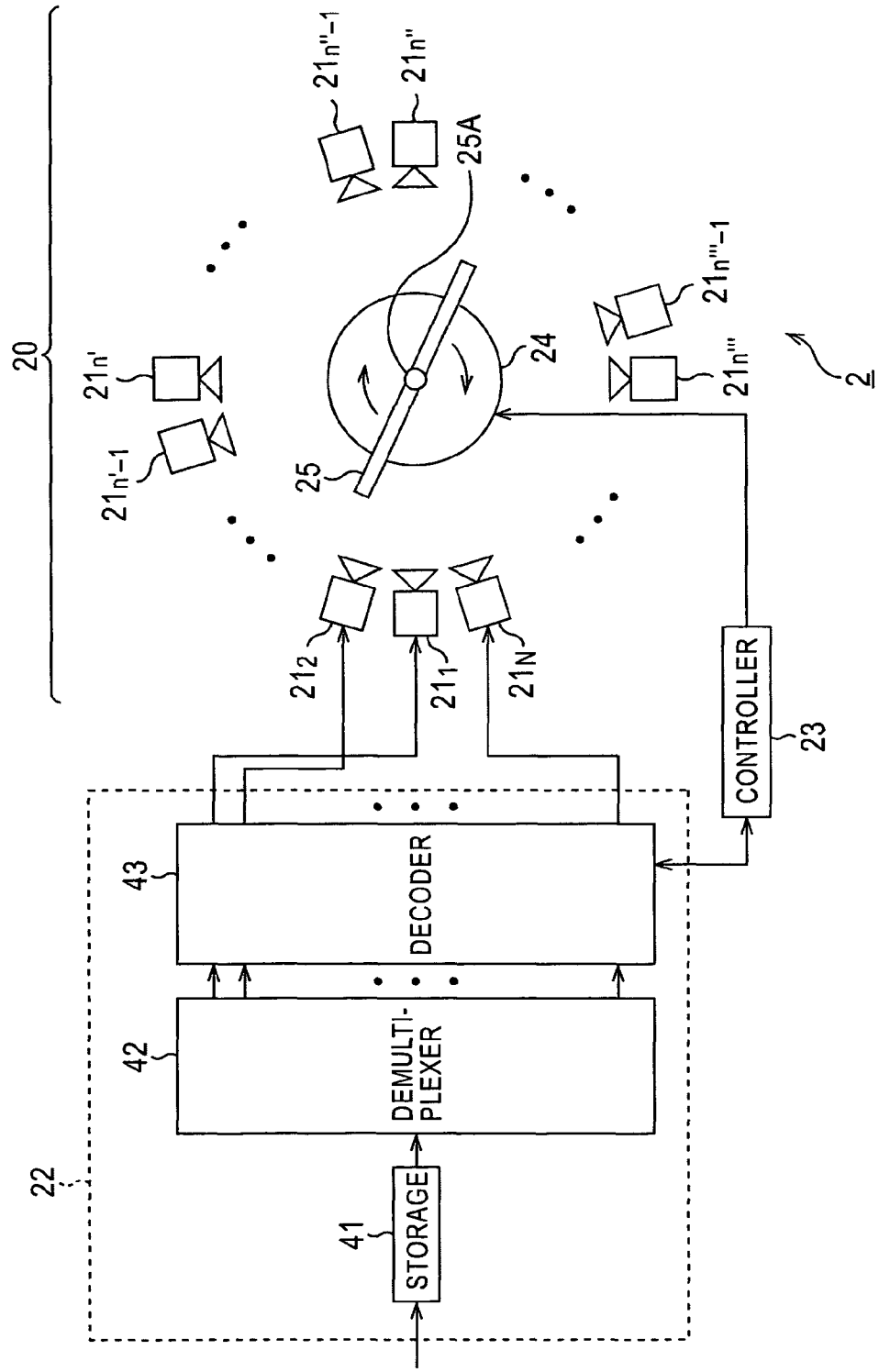
FIG. 6 is a block diagram of a display apparatus 2.

FIG. 6 illustrates the display apparatus 2 of FIG. 3.

The display apparatus 2 includes an optical display device 20, a signal processor 22, and a controller 23.

The optical display device 20 includes N projectors $21_1$ to $21_N$, a driver 24, and a light-control screen 25. The number of projectors $21_1$ to $21_N$ provided is equal to the number of cameras $11_1$ to $11_N$ of the optical image-capturing device 10.

The N projectors $21_1$ to $21_N$ are disposed horizontally around the 360° periphery of the light-control screen 25. With respect to the object, the positioning of the N projectors $21_1$ to $21_N$ corresponds to the positioning of the N cameras $11_1$ to $11_N$ of the optical image-capturing device 10 (see FIG. 4). From each of the N projectors, light rays of the corresponding image data supplied from the signal processor 22 are emitted. Thus, the light-control screen 25 is irradiated with the light rays.

In other words, the N projectors $21_1$ to $21_N$ are disposed in a state such that the physical relationship of the optical axes of the projectors is similar to that of the N cameras $11_1$ to $11_N$. Accordingly, as with the N cameras $11_1$ to $11_N$ illustrated in FIG. 4, the N projectors $21_1$ to $21_N$ are disposed at, for example, regular intervals (at equal angles) around the 360° periphery of the light-control screen 25. Furthermore, the optical axes of the projectors, for example, are in the same horizontal plane and converge at one point in that horizontal plane.

A projector $21_n$ (n=1, 2, . . . , N) emits light rays that are supplied from the signal processor 22 and that correspond to the image data of the object captured by a corresponding camera $11_n$.

The driver 24 is controlled by the controller 23 and accordingly rotates the light-control screen 25 at, for example, a constant rate.

The light-control screen 25 is, for example, a rectangular screen. The light control screen 25 receives light rays emitted from the projectors $21_n$ and displays images that correspond to the light rays.

The light-control screen 25 has an axis 25A extending vertically through the screen 25 to define left and right sides on the screen 25. The axis 25A functions as a rotational axis for the driver 24 to rotate the light-control screen 25.

The N projectors $21_1$ to $21_N$ are disposed in a state such that the optical axes of the projectors, for example, converge at one point on the axis 25A of the light-control screen 25.

The signal processor 22 includes a storage 41, a demultiplexer 42, and a decoder 43.

The storage 41 temporarily stores a data stream transmitted via the transmission medium 3 (see FIG. 3) or played back from the recording medium 4 (see FIG. 3). The demultiplexer 42 reads out the data stream stored in the storage 41. The demultiplexer 42 then demultiplexes the data stream into each encoded data, that is, each encoded image data originally captured by the corresponding one of the cameras $11_1$ to $11_N$. Each encoded data is then supplied to the decoder 43. The decoder 43 decodes each encoded data supplied from the demultiplexer 42 into image data originally captured by the corresponding one of the cameras $11_1$ to $11_N$. The decoder 43 then supplies the image data originally captured by one of the cameras $11_n$ to, for example, the corresponding projector $21_n$.

The decoder 43 supplies image data originally captured by one of the cameras $11_n$ to the corresponding projector $21_n$ in, for example, frame units. In this case, the supplying of the image data is performed synchronously with the supplying of the image data from the other cameras $11_n$ to the other corresponding projectors $21_n$.

The controller 23 controls the driver 24 so that the driver 24 rotates the light-control screen 25 in synchronization with the timing of the supplying of the image data from the decoder 43 to the projectors $21_1$ to $21_N$.

Figure 7:
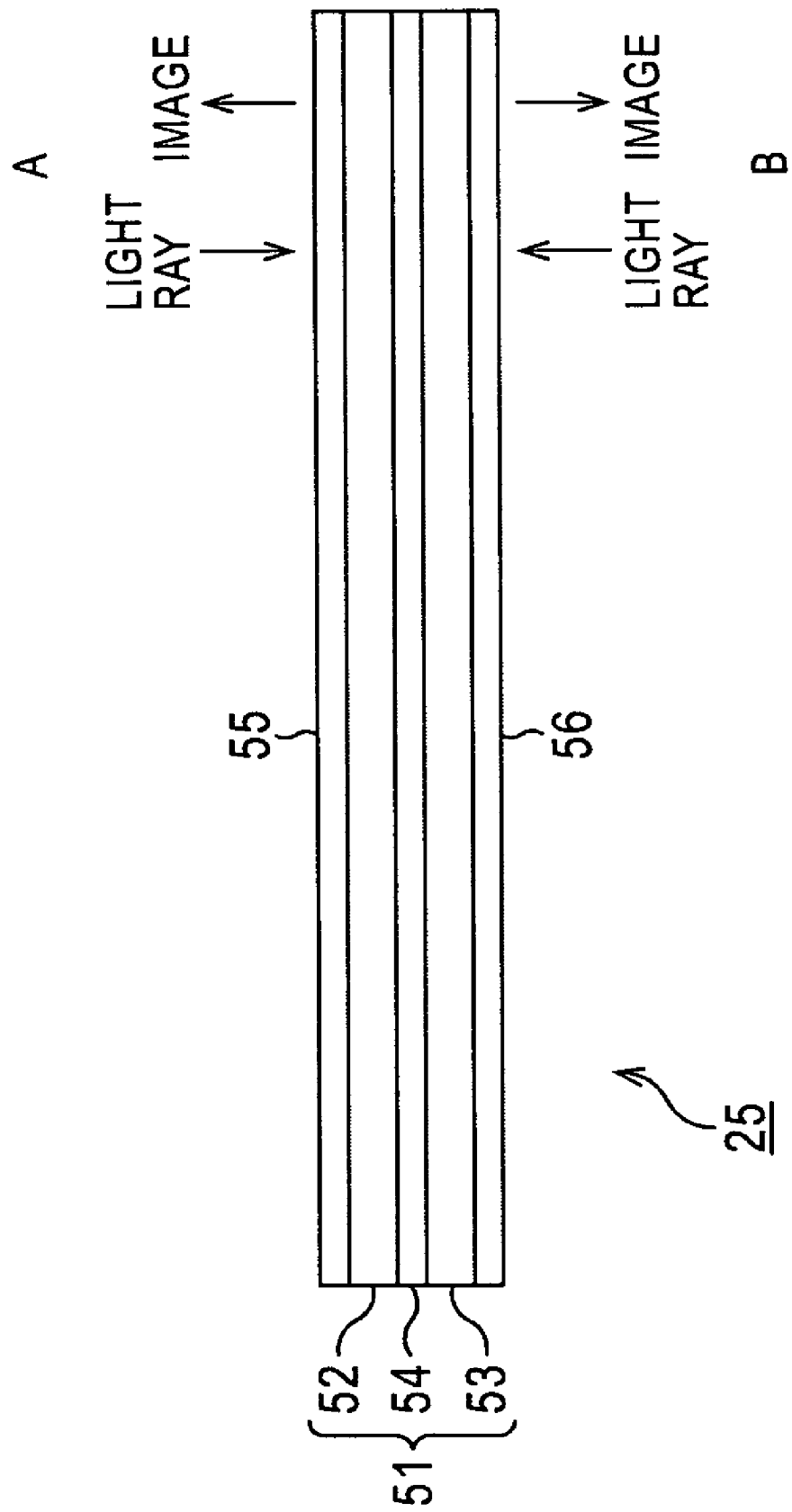
FIG. 7 is a cross-sectional view of a first configuration of a light-control screen 25.

FIG. 7 is a cross-sectional view of a first configuration of the light-control screen 25 of FIG. 6.

In this configuration of FIG. 7, the light-control screen 25 includes a double-faced screen component 51 and optical-filter films 55 and 56.

The double-faced screen component 51 is formed of flat diffusing plates 52 and 53 and a light-blocking plate 54. The light-blocking plate 54 is disposed between the diffusing plates 52 and 53 (the light-blocking plate 54 is sandwiched between the diffusing plates 52 and 53).

In the double-faced screen component 51 of this configuration of FIG. 7, the light-blocking plate 54 is disposed over the diffusing plate 53, and the diffusing plate 52 is disposed over the light-blocking plate 54.

Accordingly, light rays incident on the double-faced screen component 51 from above (adjacent to the diffusing plate 52) are received and diffused by the diffusing plate 52. Thus, when the double-faced screen component 51 is viewed from a side adjacent to reference character A, an image corresponding to the light rays is displayed on the diffusing plate 52. On the other hand, if the double-faced screen component 51 is viewed from a side adjacent to reference character B, the light-blocking plate 54 disposed in front of the diffusing plate 52 blocks light rays that are transmitted through the diffusing plate 52. The image corresponding to the light rays diffused by the diffusing plate 52 therefore cannot be seen.

Light rays incident on the double-faced screen component 51 from a side adjacent to reference character B (adjacent to the diffusing plate 53) are received and diffused by the diffusing plate 53. Thus, when the double-faced screen component 51 is viewed from the side adjacent to reference character B, an image corresponding to the light rays is displayed on the diffusing plate 53. On the other hand, if the double-faced screen component 51 is viewed from the side adjacent to reference character A, the light-blocking plate 54 disposed in front of the diffusing plate 53 blocks light rays that are transmitted through the diffusing plate 53. The image corresponding to the light rays diffused by the diffusing plate 53 therefore cannot be seen.

Consequently, the double-faced screen component 51 displays images independently in the two faces, that is, the face adjacent to the diffusing plate 52 and the face adjacent to the diffusing plate 53.

The diffusing plates 52 and 53 may be formed of a material that diffuses light, such ground glass.

In this configuration of FIG. 7, the light-control screen 25 has the optical-filter films 55 and 56 respectively disposed over the faces adjacent to the diffusing plates 52 and 53 of the double-faced screen component 51.

Figure 8:
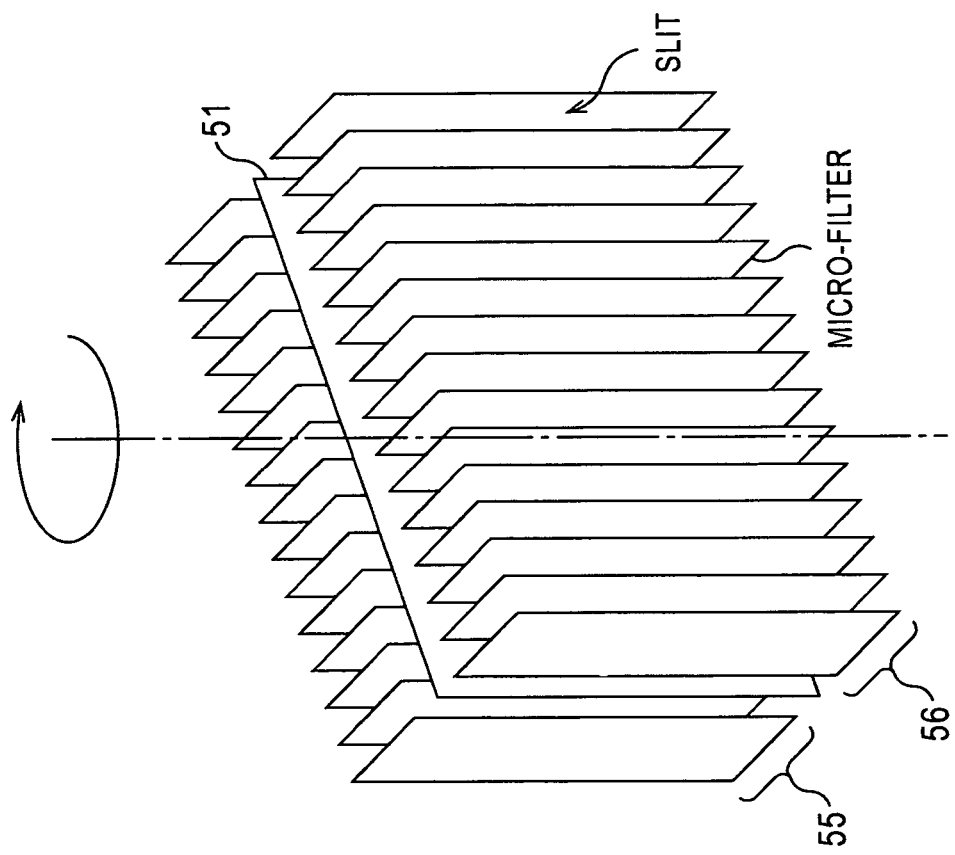
FIG. 8 is a perspective view of optical filter films 55 and 56.

As is shown in FIG. 8 in a perspective view, the optical-filter films 55 and 56 are sheet-like optical filters having a louver-like structure. The films 55 and 56 are formed of multiple fine rectangular film components that block light. The fine-film components are disposed at short intervals in a state such that the surfaces of the film components face each other. Thus, slits are formed between the fine-film components.

Figure 9:
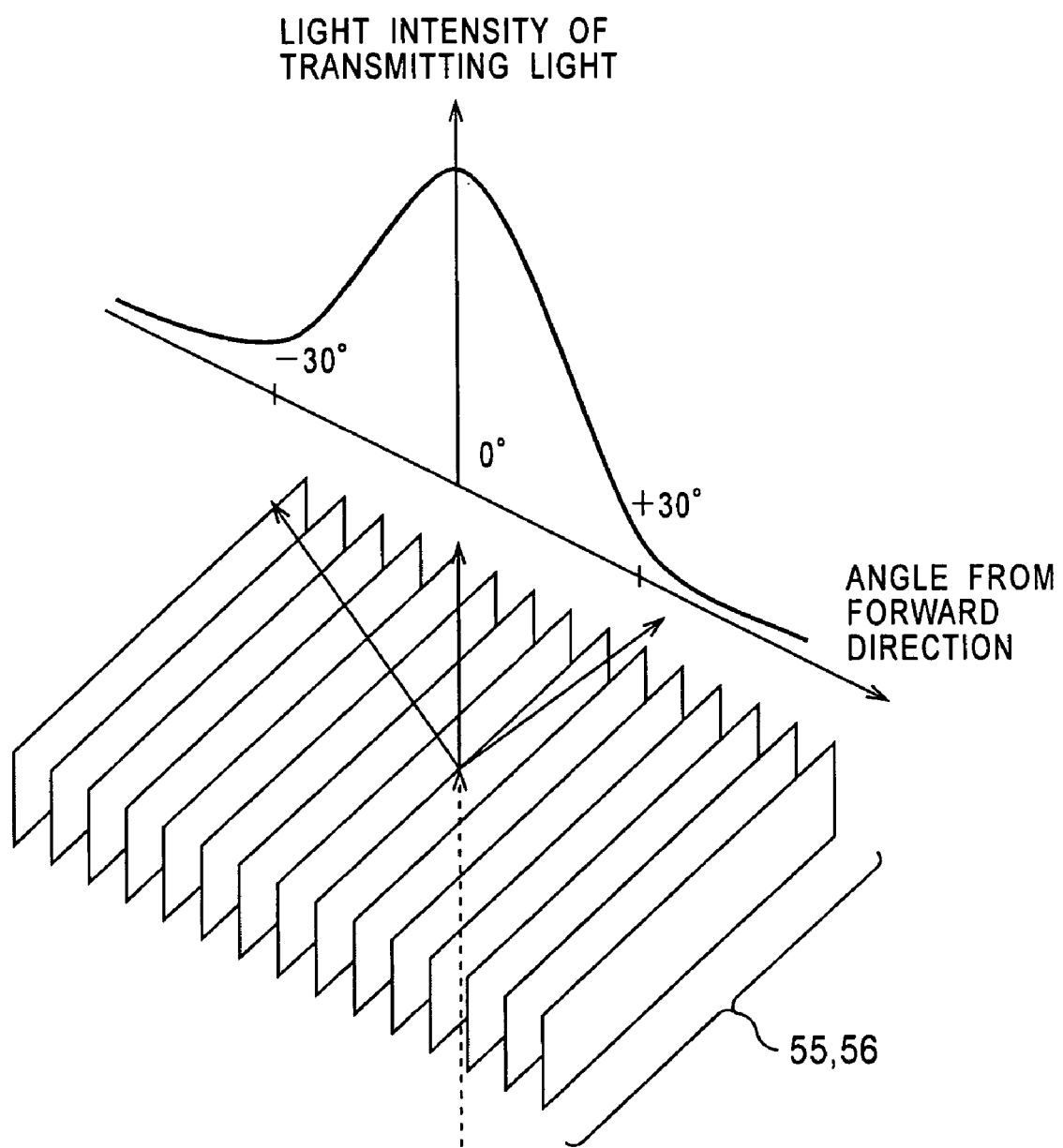
FIG. 9 illustrates the optical characteristics of the optical filter films 55 and 56.

As is shown in FIG. 9, when a direction parallel to the surfaces of the multiple fine-film components of the optical-filter films 55 and 56, that is, the direction of the slits, is defined as the forward direction, the optical-filter films 55 and 56 have optical characteristics as shown in the drawing.

In other words, the optical-filter films 55 and 56 have optical characteristics that directly transmit light rays traveling only in the forward direction, while reducing the light intensity of the transmitting light rays deviated from the forward direction (light rays that are incident on the surface of the fine-film components). Accordingly, when the optical-filter film 55 or 56 is viewed in the forward direction, the opposite side is viewable, whereas when the optical-filter film 55 or 56 is viewed in a direction deviated from the forward direction (viewed at an angle), the opposite side cannot be viewed.

For the optical-filter films 55 and 56 having the above-mentioned optical characteristics, a Light Control Film manufactured by Sumitomo 3M Ltd. may be used.

In the light-control screen 25 of FIG. 7, the optical-filter film 55 having the above-mentioned optical characteristics is disposed adjacent to the diffusing plate 52 of the double-faced screen component 51. The film 55 is disposed in a state such that the slits are arranged side by side along the vertical direction of the screen 25 (in a direction parallel to the axis 25A of the light-control screen 25). Likewise, the optical-filter film 56 having the above-mentioned optical characteristics is disposed adjacent to the diffusing plate 53 of the double-faced screen component 51. The film 56 is disposed in a state such that the slits are arranged side by side along the vertical direction of the screen 25.

Accordingly, when light rays are incident on the diffusing plate 52 and are diffused by the plate 52, the light rays traveling in the forward direction are transmitted through the optical-filter film 55, whereas the light rays traveling in other directions are (ideally all) blocked by the optical-filter film 55. As a result, when the light-control screen 25 is viewed from a viewing point along the forward direction of the optical-filter film 55, the light rays diffused by the diffusing plate 52 that travel towards the viewing point are transmitted through the optical-filter film 55 to reach the viewing point. The image is thus viewable. On the other hand, when the light-control screen 25 is viewed from a viewing point that is deviated to the left or the right (in the horizontal direction) of the forward direction of the optical-filter film 55, the light rays diffused by the diffusing plate 52 that travel towards the viewing point are blocked by the optical-filter film 55 and do not reach the viewing point. The image therefore cannot be viewed.

Likewise, when light rays are incident on the diffusing plate 53 and are diffused by the plate 53, the light rays traveling in the forward direction are transmitted through the optical-filter film 56, whereas the light rays traveling in other directions are (ideally all) blocked by the optical-filter film 56. As a result, when the light-control screen 25 is viewed from a viewing point along the forward direction of the optical-filter film 56, the light rays diffused by the diffusing plate 53 that travel towards the viewing point are transmitted through the optical-filter film 56 to reach the viewing point. The image is thus viewable. On the other hand, when the light-control screen 25 is viewed from a viewing point that is deviated to the left or the right of the forward direction of the optical-filter film 56, the light rays diffused by the diffusing plate 53 that travel towards the viewing point are blocked by the optical-filter film 56 and do not reach the viewing point. The image therefore cannot be viewed.

In the light-control screen 25 of FIG. 7, (ideally,) an image is presented only to a user positioned along the forward direction of the screen 25, whereas an image is not presented to a user positioned to the left or the right of the forward direction of the screen 25.

If the face of the light-control screen 25 on which an image is displayed is defined as a display face, the light-control screen 25 of FIG. 7 has two display faces adjacent to the diffusing plates 52 and 53. When one of the display faces is in front of one of the projectors $21_n$, light rays emitted from that projector $21_n$ are received and diffused by the diffusing plate 52 or 53 through the optical-filter film 55 or 56, respectively. An image corresponding to the light rays is thus displayed on the diffusing plate 52 or 53 acting as the display face. The image displayed on the diffusing plate 52 or 53 can be viewed only by a user positioned along the forward direction of the display face through the optical-filter film 55 or 56, whereas the image cannot be viewed by a user in a position other than along the forward direction of the display face.

As described above, each of the projectors $21_n$ emits light rays corresponding to the image data of the object captured by the corresponding camera $11_n$. Accordingly, the image of the object can be viewed by a user as if the object is seen from the camera $11_n$ only when the corresponding projector $21_n$ is in front of one of the display faces of the light-control screen 25 and when the user is positioned along the forward direction of that display face.

Figure 10A:
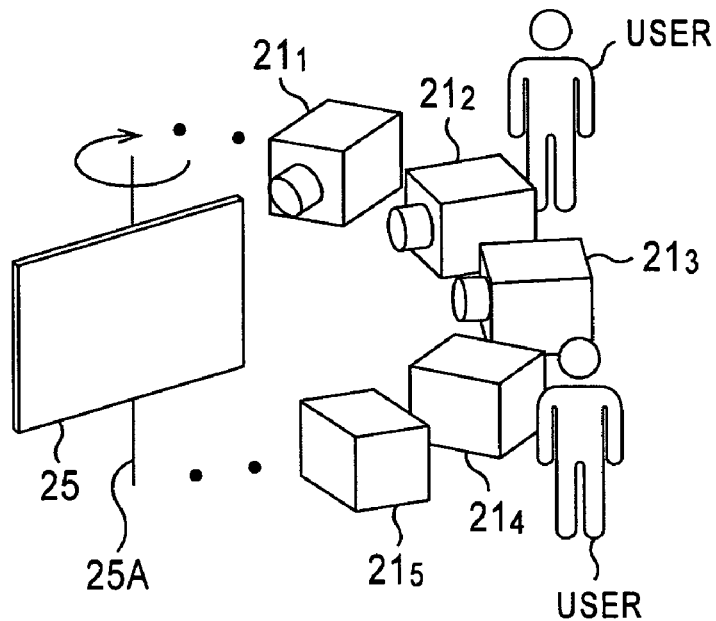
FIG. 10A is a diagram to describe the image display on an optical display device 20.
Figure 10B:
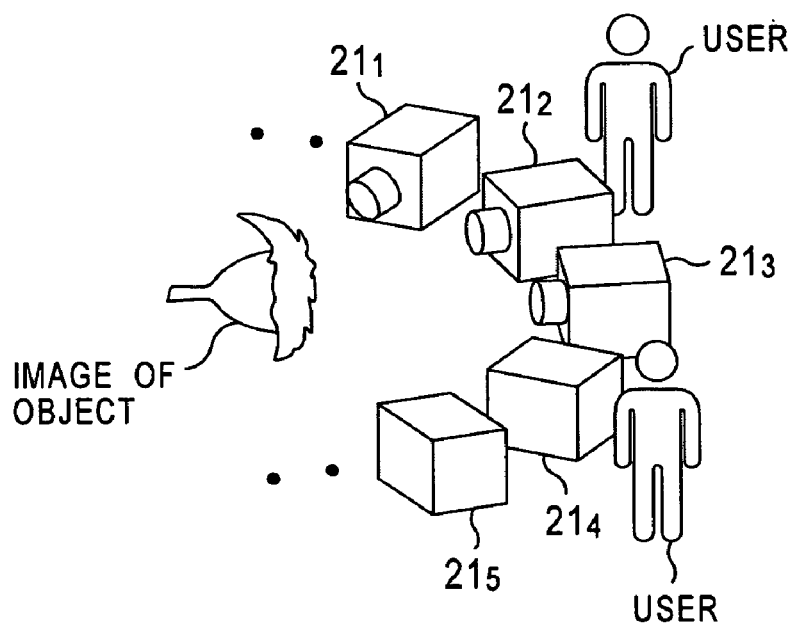
FIG. 10B is a diagram to describe the image display on the optical display device 20.

As is shown in FIG. 10A, the light-control screen 25 rotates around or on the vertical axis 25A acting as the rotational axis. As is shown in FIG. 10B, when the forward direction of one of the display faces of the light-control screen 25 is aligned with the optical axis of one of the N projectors $21_1$ to $21_N$, light rays emitted from that projector form an image on the display face of the light-control screen 25. Thus, each of the images of the object captured by the cameras $11_1$ to $11_N$ is displayed. The image can be viewed only by a user positioned along the forward direction of the display face.

Accordingly, for every direction one of the display faces of the light-control screen 25 faces, a different image of the object, as the object is seen from that direction, is displayed on the display face. As a result, from every position a user views the light-control screen 25, the user sees the image of the object as the object is seen from that position. This means that images according to various viewing points of multiple users are displayed.

As shown in FIGS. 10A and 10B, a user may, for example, view the light-control screen 25 from behind one of the projectors $21_n$ to see an image displayed on one of the display faces.

The controller 23 controls the driver 24, which rotates the light-control screen 25, so that the angular rotation rate of the display faces is higher than the frame rate (or the field rate) of the supplying of the image data from the signal processor 22.

This means that if the frame rate of the supplying of the image data from the signal processor 22 (the frame rate of the projection of images from the projectors $21_n$) is, for example, 30 Hz, the light-control screen 25 having two display faces is rotated at an angular rate of at least 15 Hz.

In this case, each of the projectors $21_n$ faces one of the display faces of the light-control screen 25 at least once within a frame period, thus preventing dropped frames.

A case where the light-control screen 25 rotates at an angular rate that is lower than the frame rate of the supplying of the image data from the signal processor 22 will be described below. When one of the projectors $21_n$ faces one of the display faces, image data of a certain frame is displayed on the display face. During a period before light rays corresponding to image data of a subsequent frame are emitted, the display face does not face the projector $21_n$, and the image of the subsequent frame is thus not displayed. This means that the frame is dropped. To prevent such frame dropping, each of the projectors $21_n$ must face one of the display faces of the light-control screen 25 at least once within a frame period. This means that the light-control screen 25 must be rotated at an angular rate that is higher than the frame rate of the supplying of the image data from the signal processor 22. The rotational frequency of the light-control screen 25 is determined according to, for example, the frame rate of the projection of images from the projector $21_n$ or the projection time for one frame.

Figure 11:
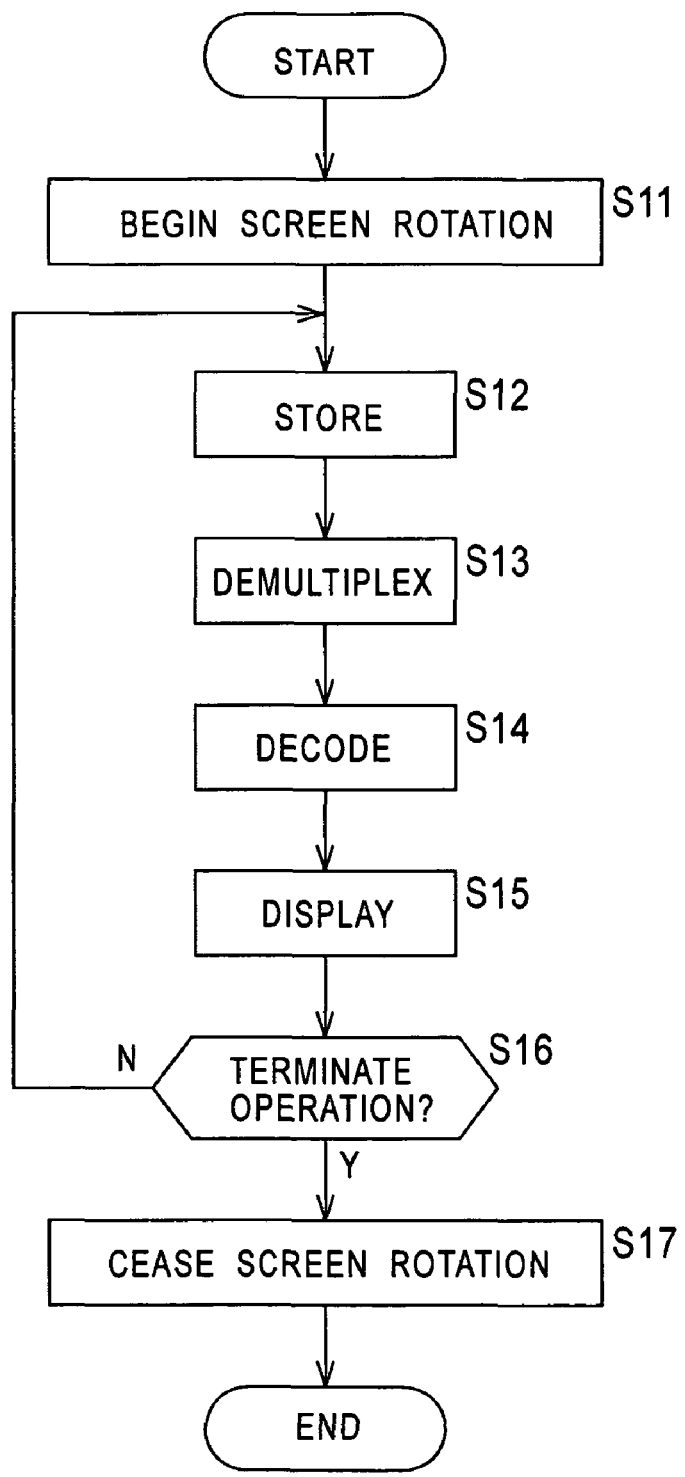
FIG. 11 is a flow chart describing the operation of the display apparatus 2.

Referring to a flow chart of FIG. 11, the operation of the display apparatus 2 of FIG. 6 will now be described.

First, in step S11, the controller 23 controls the driver 24 to begin rotating the light-control screen 25. Step S11 then proceeds to step S12.

In step S12, the storage 41 stores, for example, a data stream of one frame supplied from the transmission medium 3 or the recording medium 4 (see FIG. 3). Step S12 then proceeds to step S13. In step S13, the demultiplexer 42 reads out the data stream stored in the storage 41. The demultiplexer 42 then demultiplexes the data stream into each encoded data, that is, each encoded image data originally captured by the corresponding one of the cameras $11_1$ to $11_N$. Each encoded data is then supplied to the decoder 43.

In step S14, the decoder 43 decodes each encoded data supplied from the demultiplexer 42 into image data originally captured by the corresponding one of the cameras $11_1$ to $11_N$. The decoder 43 then supplies the image data originally captured by one of the cameras $11_n$ to, for example, the corresponding one of the projectors $21_n$. Step S14 then proceeds to step S15.

In step S15, the projectors $21_n$ emit light rays corresponding to the image data supplied from the decoder 43 toward the light-control screen 25. When one of the projectors $21_n$ faces one of the display faces of the rotating light-control screen 25, an image corresponding to the light rays emitted from that projector is displayed on the display face.

In step S16, the controller 23 determines whether an operating unit, which is not shown in the drawings, is operated by a user to terminate the display of the image data (referred to as display termination hereinafter).

If the controller 23 determines that the display termination is not performed in step S16, step S16 then returns to step S11. In step 11, the storage 41 stores a subsequent data stream of one frame supplied thereto. The same steps are then repeated over again.

On the other hand, if the controller 23 determines that the display termination is performed in step S16, step S16 then proceeds to step S17. The controller 23 then controls the driver 24 to stop the rotation of the light-control screen 25, and the operation ends.

As described above, by rotating the light-control screen 25 and emitting light rays corresponding to image data captured from each of the multiple angles onto the screen 25, the images of the object from various directions can be viewed on the light-control screen 25. Because the light-control screen 25 has the optical-filter films 55 and 56 over the respective two display faces of the screen 25, images displayed on the display faces cannot be viewed by a user if the user is in a position other than along the forward direction of the display faces.

This means that images of an object can be viewed from various directions by multiple users as if the users were viewing the real object from various viewing points.

Furthermore, high-resolution images can be easily provided by employing high-resolution cameras $11_n$ and projectors $21_n$.

Whether the images are moving or not, the processing capacity of the image-capturing apparatus 1 and the display apparatus 2 is scarcely affected. Thus, even in the case of moving images, images viewable from various viewing points of multiple users are provided.

FIG. 12 illustrates a second configuration of the light-control screen 25 of FIG. 6. In FIG. 12, components that correspond to the components in FIG. 7 are indicated by the same reference numerals, and the description of those components will be omitted where appropriate.

In this configuration of FIG. 12, the light-control screen 25 includes a reflective-screen component 61 and an optical-filter film 55.

Referring to FIG. 12, the reflective-screen component 61 has a light-blocking plate 54 on which a diffusing plate 52 is disposed. The optical-filter film 55 is disposed over the diffusing plate 52.

In other words, the light-control screen 25 of FIG. 12 is equivalent to the light-control screen 25 of FIG. 7 without the diffusing plate 53 and the optical-filter film 56.

This means that the light-control screen 25 of FIG. 12 has only one display face adjacent to the reference character A (adjacent to the diffusing plate 52).

In the light-control screen 25 of FIG. 12, light rays are emitted toward the diffusing plate 52 from the side adjacent to the reference character A. The light rays are diffused by the diffusing plate 52, and an image corresponding to the light rays is displayed thereon. The image is viewed through the optical-filter film 55. In the light-control screen 25 of FIG. 12, only the diffusing plate 52 is irradiated with light rays, meaning an image is displayed only on the side adjacent to the diffusing plate 52. Accordingly, the light-control screen 25 of FIG. 12 has only one display face.

In the light-control screen 25 of FIG. 6 and FIG. 12, the light rays reflected by the light-control screen 25 form an image in the eyes of a user, whereby the image is perceived by the user. The light-control screen 25 of FIG. 6 and FIG. 12 is therefore a reflective screen.

FIG. 13 illustrates a third configuration of the light-control screen 25 of FIG. 6. In FIG. 13, components that correspond to the components in FIGS. 7 and 12 are indicated by the same reference numerals, and the description of those components will be omitted where appropriate.

In this configuration of FIG. 13, the light-control screen 25 includes a transmissive-screen component 62 and an optical-filter film 55.

The transmissive-screen component 62 includes a diffusing plate 52. The optical-filter film 55 is disposed over a side of the diffusing plate 52 adjacent to the reference character A.

When light rays are emitted toward the underside (the side adjacent to the diffusing plate 52) of the transmissive-screen component 62 having the above-mentioned structure, the diffusing plate 52 diffuses the light rays so as to display an image that corresponds to the light rays. This image can be seen from above the light-control screen 25 through the optical-filter film 55. In FIG. 13, the image displayed on the diffusing plate 52 can also be seen from below the screen 25. When the image is seen from below the screen 25, however, the image cannot only be seen in the forward direction of the screen 25 but also from any direction. For this reason, the underside of the diffusing plate 52 is not considered as a display face. Accordingly, in the light-control screen 25 of FIG. 13, an image is displayed only on a side opposite to the side of the diffusing plate 52 on which the light rays are incident. This means that the light-control screen 25 of FIG. 13 has only one display face.

In the light-control screen 25 of FIG. 13, the light rays transmitted through the light-control screen 25 form an image in the eyes of a user, whereby the image is perceived by the user. The light-control screen 25 of FIG. 13 is therefore a transmissive screen.

As described above, when the light-control screen 25 of FIG. 7 or FIG. 12 is being used, the light rays are reflected by the light-control screen 25 to form an image in the eyes of a user, whereby the image is perceived by the user. For this reason, if the user is in the same direction as one of the projectors $21_n$ emitting the light rays that correspond to the viewing image on the light-control screen 25, the user is able to view that image.

On the other hand, when the light-control screen 25 of FIG. 13 is being used, the light rays are transmitted through the light-control screen 25 to form an image in the eyes of a user, whereby the image is perceived by the user. Accordingly, as is shown in FIG. 14A and FIG. 14B, the user must be in a position opposite to that of one of the projectors $21_n$ emitting the light rays that correspond to the viewing image on the light-control screen 25 so that the user can view the image.

Figure 14A:
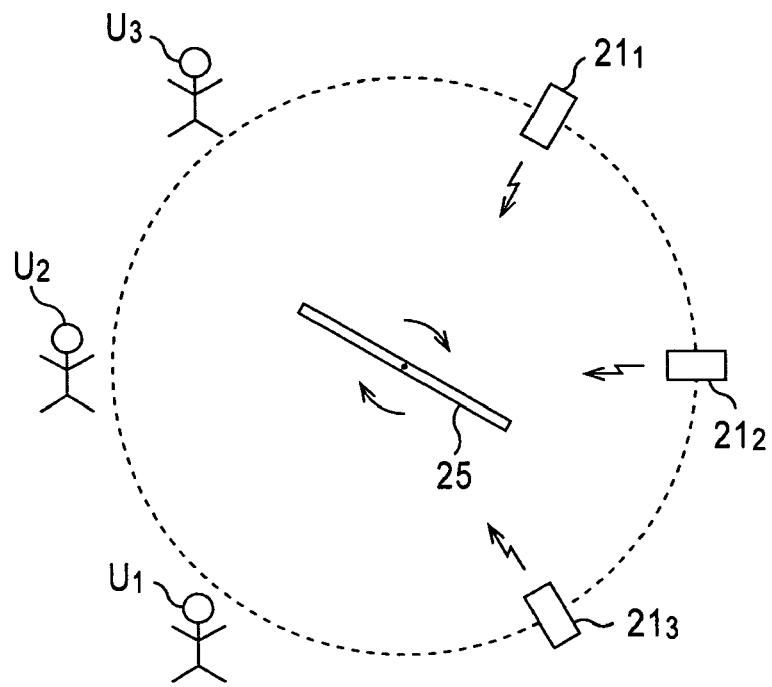
FIG. 14A illustrates the positional relationship between projectors $21_n$ and users.

In FIG. 14A, the projectors $21_n$ are disposed in positions within a 180° region of the 360° periphery of the light-control screen 25. Users are positioned within the other 180° region. The users are in positions opposite to the positions of the projectors $21_n$ to view the images. In this case, the users may only be located within the 180° region in which the projectors $21_n$ are not disposed. This means that the users can only view images of the object from directions within the 180° region.

Figure 14B:
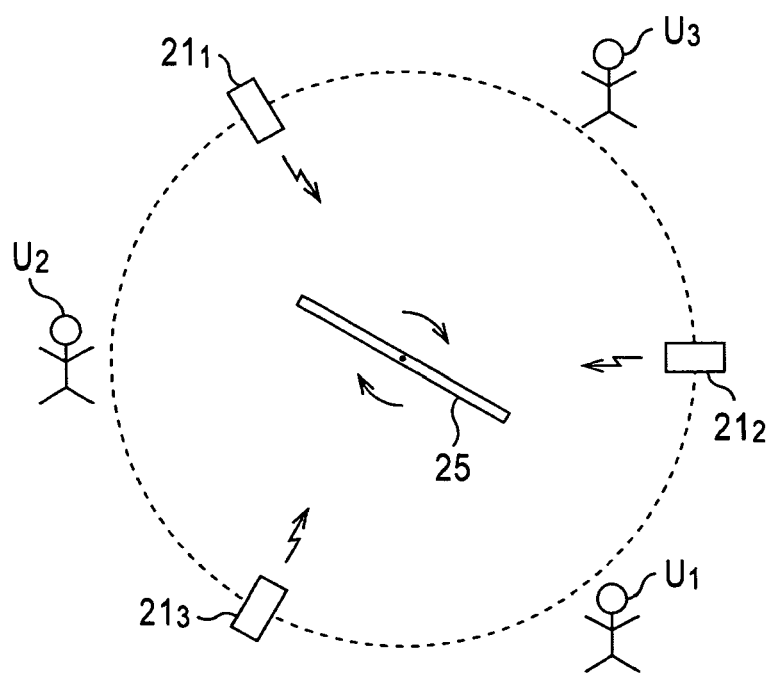
FIG. 14B illustrates the positional relationship between projectors $21_n$ and users.

As shown in FIG. 14B, the projectors $21_n$ and the users may therefore be alternately positioned. In this case, the users may be located to any position in the 360° range.

The light-control screen 25 is not limited to the structures described above. Other than the above structures, the structure of the light-control screen 25 may be of any type that displays an image by receiving and diffusing light rays entering only from a certain direction, or that displays an image by receiving and diffusing light and projects only a portion of light rays in a certain direction from the light rays corresponding to that image.

Figure 15:
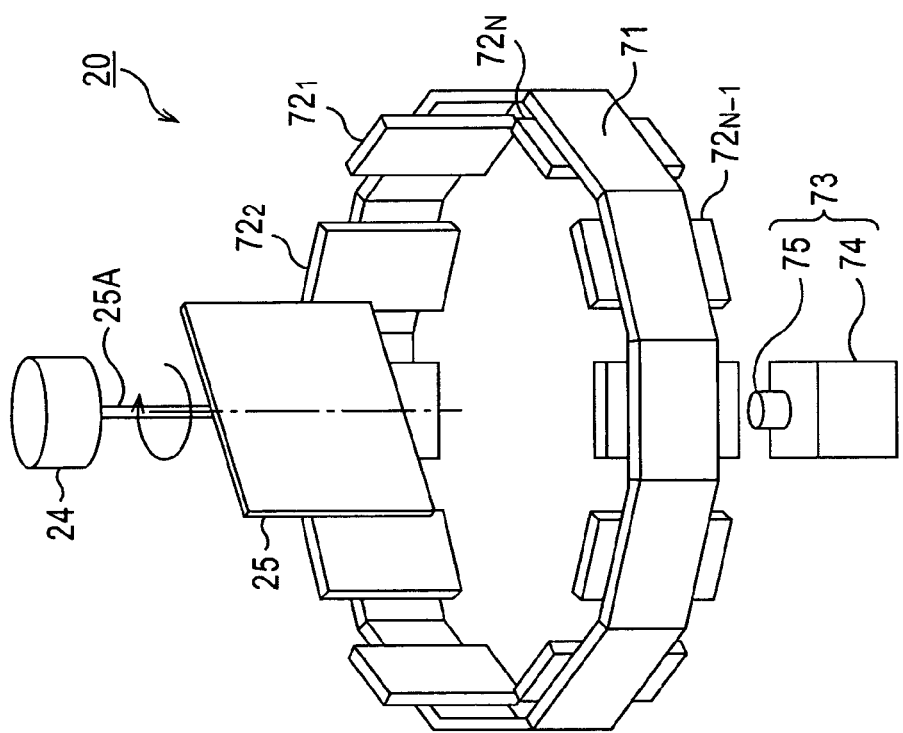
FIG. 15 illustrates an example of the optical display device 20.

FIG. 15 illustrates another example of the optical display device 20 of FIG. 6. In FIG. 15, components that correspond to the components in FIG. 6 are indicated by the same reference numerals, and the description of those components will be omitted where appropriate. Other than having a support 71 and N flat mirrors $72_1$ to $72_N$ in place of the N projectors $21_1$ to $21_N$ of the optical display device 20 of FIG. 6, the optical display device 20 of FIG. 15 has basically the same structure as the optical display device 20 of FIG. 6.

However, while the driver 24 in the optical display device 20 of FIG. 6 is fixed to, for example, the ground to rotate the light-control screen 25, the driver 24 in the optical display device 20 of FIG. 15 is fixed to, for example, the ceiling to rotate the light-control screen 25.

The support 71 is substantially cylindrical and surrounds the light-control screen 25. The support 71 is disposed lower than the light-control screen 25 so as not to interfere with the view of the image displayed on the light-control screen 25.

The N flat mirrors $72_1$ to $72_N$ are disposed around the inner side of the cylindrical support 71 such that the normal line (the forward direction) of each mirror is directed toward the axis 25A of the light-control screen 25. The support 71 holds the N mirrors $72_1$ to $72_N$.

Other than holding the flat mirrors $72_n$, the support 71 also prevents light rays emitted by a fish-eye projector 73, which will be described below, from directly entering the view of a user.

The fish-eye projector 73 includes a projector component 74 and a fish-eye lens 75. The projector component 74 emits light rays corresponding to image data supplied from the signal processor 22. The fish-eye lens 75 then emits the light rays from the projector component 74 outward at wide angles into the surrounding area. The fish-eye projector 73 is disposed such that the optical axis of the projector 73, for example, is aligned with the axis 25A of the light-control screen 25. Furthermore, the fish-eye 25 projector 73 is disposed lower than the support 71.

Figure 16:
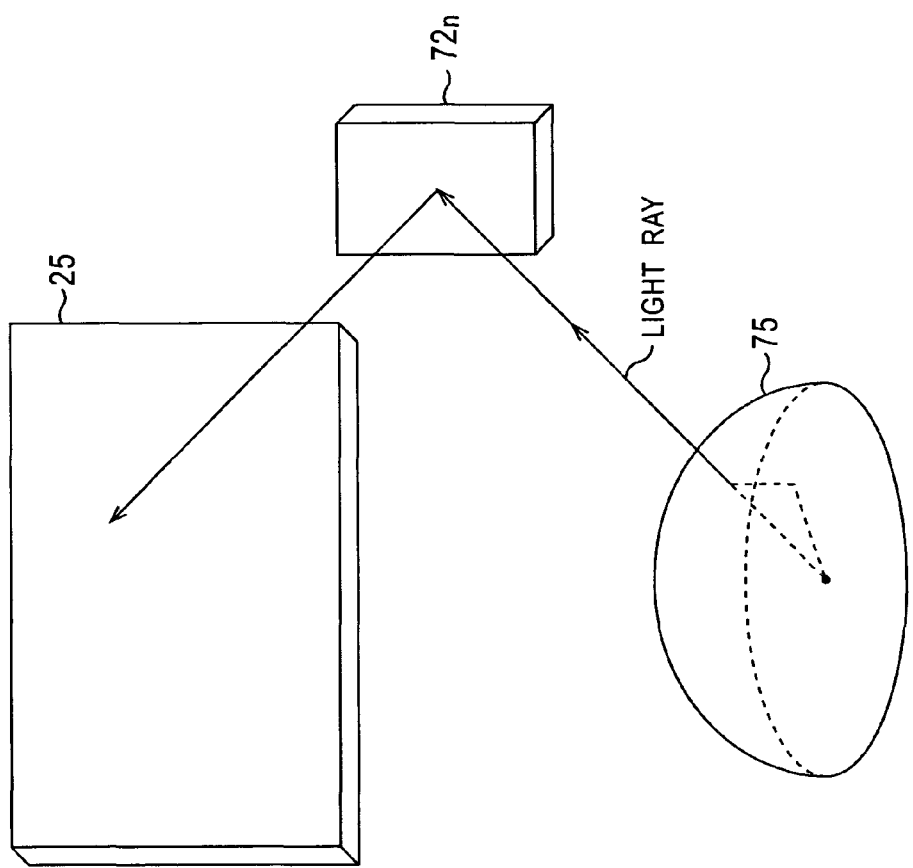
FIG. 16 illustrates an optical path of a light ray according to the optical display device 20.

In the optical display device 20 having the above-described structure, the fish-eye projector 73 emits light rays corresponding to the image data supplied from the signal processor 22 at wide angles through the fish-eye lens 75. As shown in FIG. 16, the light rays emitted from the fish-eye projector 73 are incident on each of the flat mirrors $72_n$ held by the support 71 that surrounds the optical axis of the fish-eye projector 73. The light rays are then reflected by each of the mirrors $72_n$ and are directed towards the light-control screen 25. The light-control screen 25 receives the light rays, and an image corresponding to the light rays is displayed on the screen 25.

In the optical display device 20 of FIG. 15, if the light rays reflected by the mirrors $72_n$ and directed towards the light-control screen 25 are equivalent to the light rays emitted from the projectors $21_n$ of FIG. 6, the flat mirrors $72_n$ are equivalent to the projectors $21_n$. Accordingly, an image on the screen 25 in FIG. 15 is displayed in a similar manner to the image displayed on the screen 25 of the optical display device 20 of FIG. 6.

Figure 17:
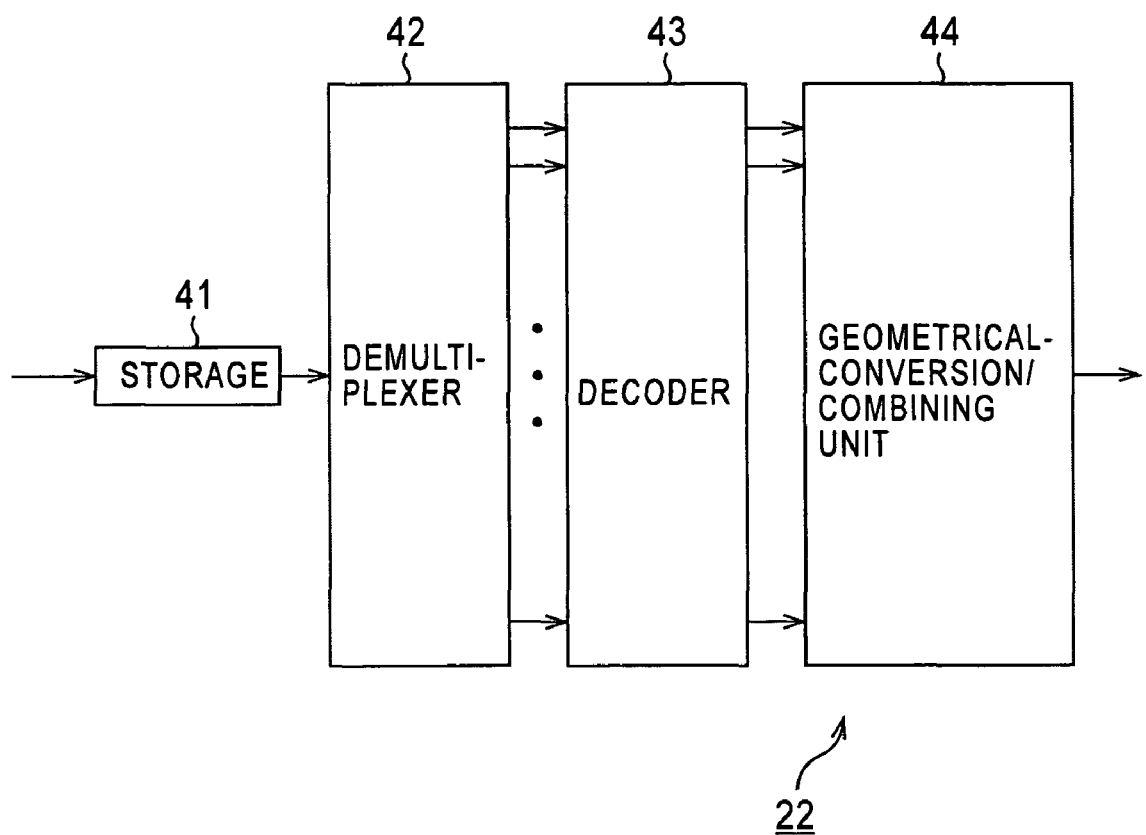
FIG. 17 is a block diagram of an example of a signal processor 22.

FIG. 17 illustrates an example of the signal processor 22 of FIG. 6 in the case where the optical display device 20 has the structure as is shown in FIG. 15. In FIG. 17, components that correspond to the components in FIG. 6 are indicated by the same reference numerals, and the description of those components will be omitted where appropriate. Other than having a geometrical-conversion/combining unit 44, the signal processor 22 of FIG. 17 has basically the same structure as the signal processor 22 of FIG. 6.

The geometrical-conversion/combining unit 44 performs geometrical conversion on image data captured by each of the cameras $11_1$ to $11_N$ and supplied from the decoder 43. The converted image data is then combined by the geometrical-conversion/combining unit 44 to generate image data (referred to as geometrically-converted image data hereinafter) of which light rays from the fish-eye projector 73 reflected toward the light-control screen 25 by the flat mirrors $72_n$ are equivalent to the light rays emitted from the projectors $21_n$ of FIG. 6. The geometrically-converted image data is then supplied to the fish-eye projector 73 (see FIG. 15).

Figure 18:
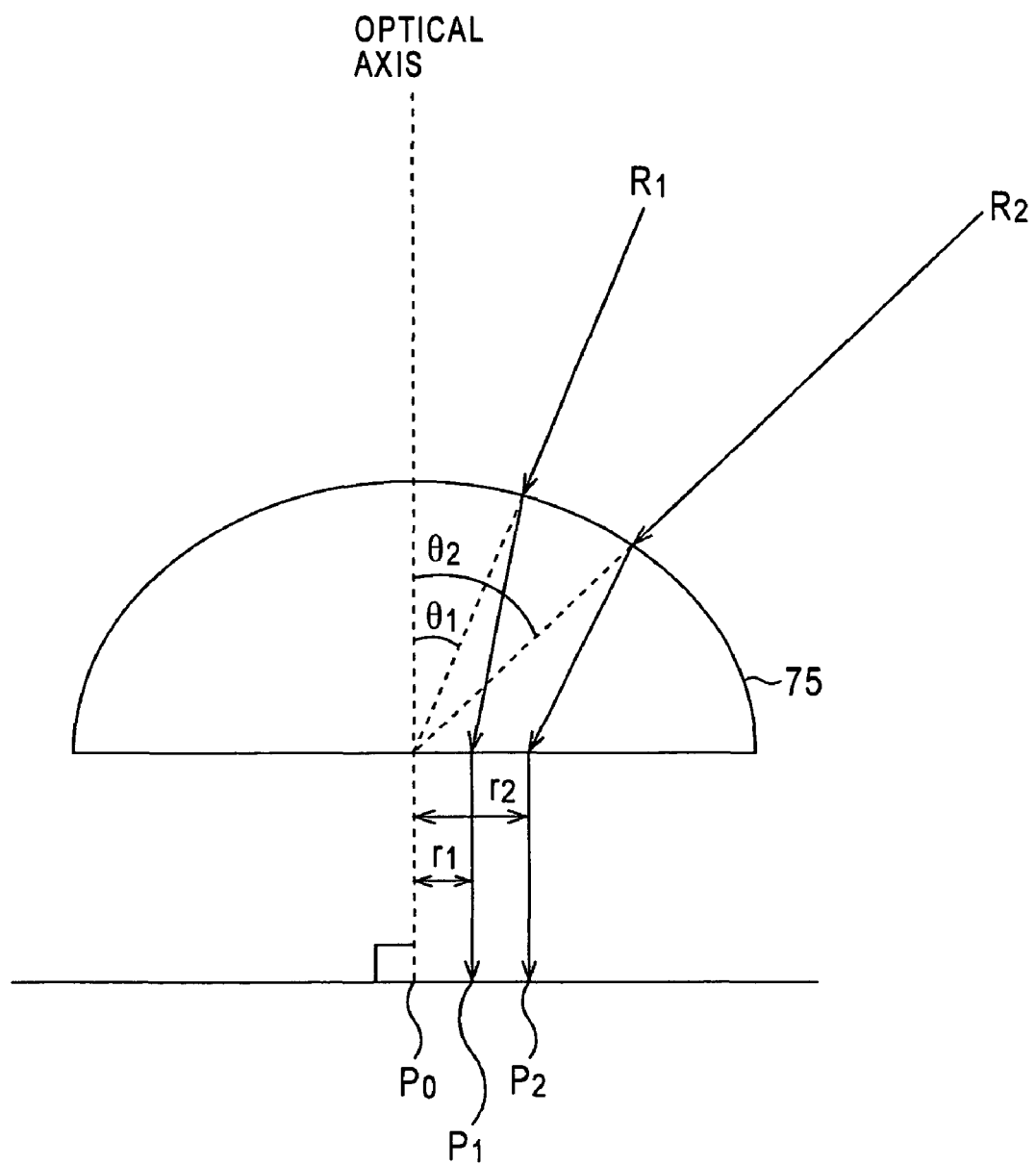
FIG. 18 illustrates an equidistant projection fish-eye lens.

To simply explain the fish-eye lens 75 of the fish-eye projector 73, an equidistant projection fish-eye lens (an fθ fish-eye lens) shown in FIG. 18, for example, is used.

In the equidistant projection fish-eye lens 75, if the angle of an incident light ray with respect to the optical axis of the fish-eye lens 75 is represented by θ and the focal length of the fish-eye lens 75 is represented by f, the image height y can be represented by fθ.

As is shown in FIG. 18, a point where the optical axis of the fish-eye lens 75 and a two-dimensional plane perpendicular to the optical axis meet is represented by a reference point $P_0$. When an incident light ray $R_1$ with an incident angle $θ_1$ enters the fish-eye lens 75, a distance $r_1$ between a point $P_1$ at which the incident light ray $R_1$ is received on the two-dimensional plane and the reference point $P_0$ is represented by $f\theta_1$. Similarly, when an incident light ray $R_2$ with an incident angle $\theta_2$ enters the fish-eye lens 75, a distance $r_2$ between a point $P_2$ at which the incident light ray $R_2$ is received on the two-dimensional plane and the reference point $P_0$ is represented by $f\theta_2$. If the incident angle $\theta_2$ of the incident light ray $R_2$ is, for example, two times the dimension of the incident angle $\theta_1$ of the incident light ray $R_1$, the distance $r_2$ is two times greater than the distance $r_1$.

Figure 19:
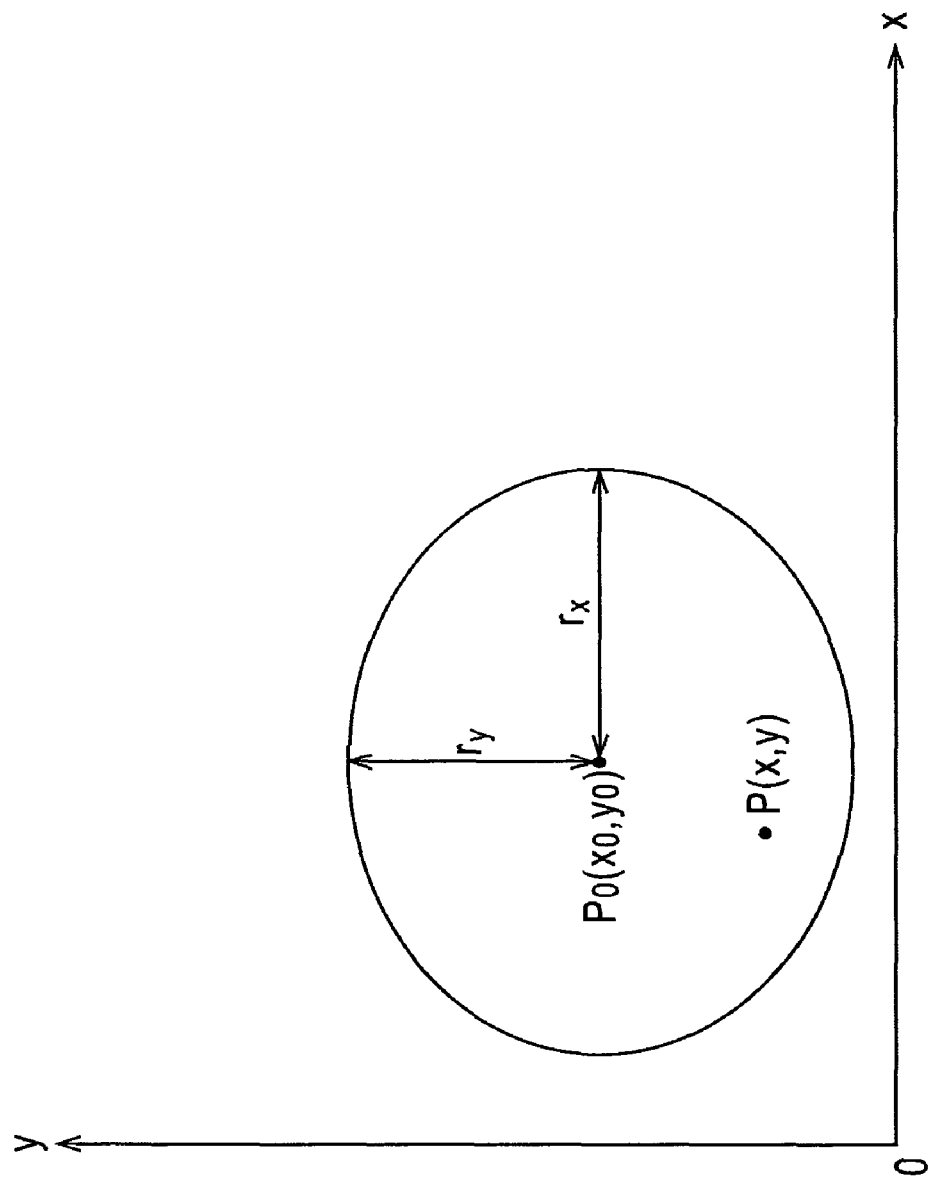
FIG. 19 is a diagram illustrating a light ray projected from a fish-eye lens 75.

As is shown in FIG. 19, a coordinate system is assumed in the two-dimensional plane perpendicular to the optical axis of the fish-eye lens 75, in which the coordinates of the reference point $P_0$ are indicated by $(x_0, y_0)$. An ellipsoid having the reference point $P_0$ as the center is assumed. One of the long axis or the short axis of the ellipsoid is disposed parallel to one of the x-axis and the y-axis of the two-dimensional coordinate system, and the other one of the long axis or the short axis of the ellipsoid is disposed parallel to the other one of the x-axis and the y-axis of the two-dimensional coordinate system.

In this case, the relationship between the coordinates (x, y) of a point (pixel) P within the ellipsoid in the two-dimensional coordinate system and the direction of a light ray projected at the point P by the fish-eye lens 75 is given by the following equation.

$$\begin{pmatrix} x \\ y \end{pmatrix} = \begin{pmatrix} x_0 + r_x \times \dfrac{\pi/2 - \theta}{\pi/2} \cos\phi \\ y_0 + r_y \times \dfrac{\pi/2 - \theta}{\pi/2} \sin\phi \end{pmatrix} \quad (1)$$

In Equation (1), the character $r_x$ indicates half the length of either the major axis or the minor axis, parallel to the x-axis, of the ellipsoid assumed in the two-dimensional coordinate system. The character $r_y$ indicates half the length of either the major axis or the minor axis that is parallel to the y-axis.

Figure 20:
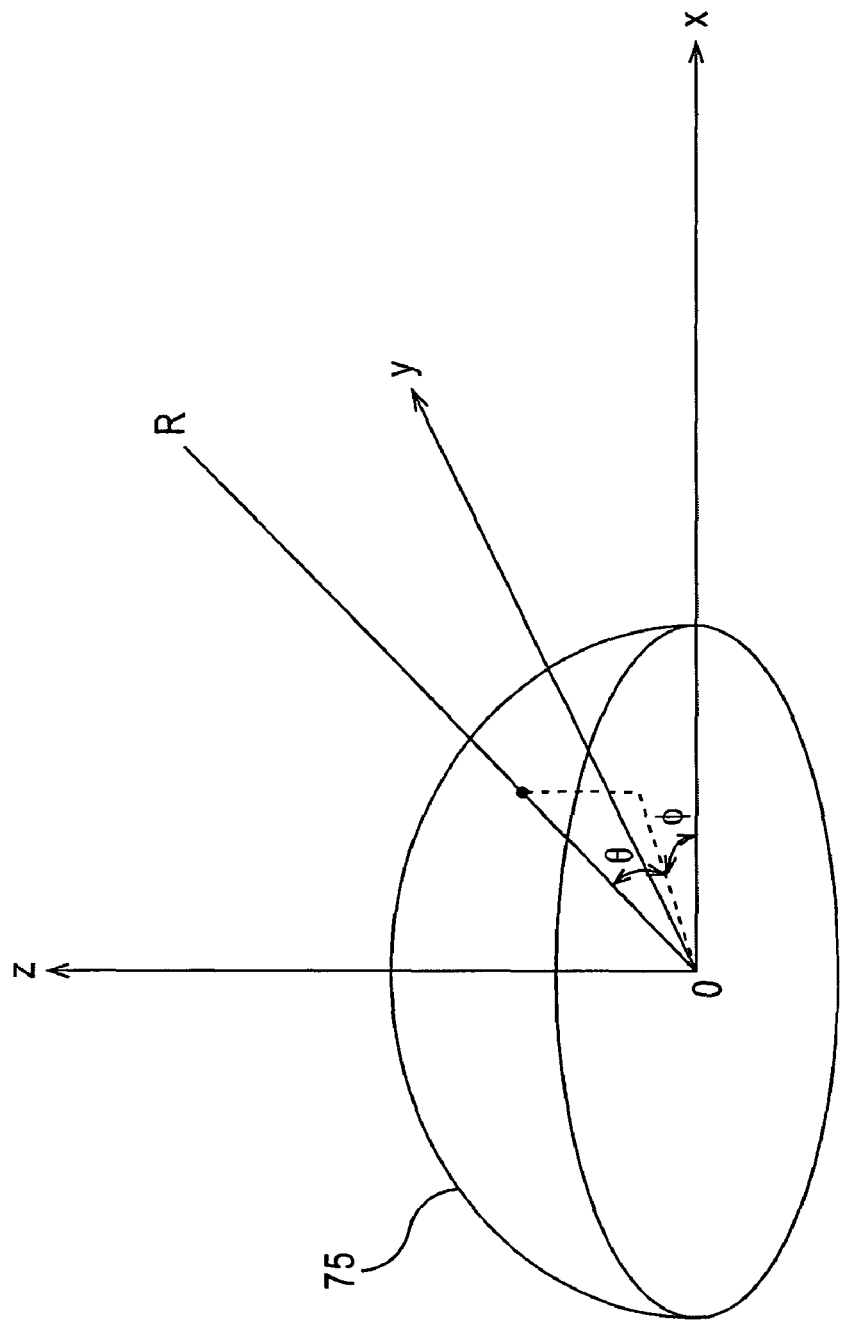
FIG. 20 is a diagram illustrating the traveling direction of a light ray R represented by angles $\theta$ and $\phi$.

FIG. 20 illustrates a three-dimensional coordinate system in which the optical axis of the fish-eye lens 75 acts as the z-axis, and the x-axis and the y-axis of the two-dimensional coordinate system having the reference point $P_0$ as the origin of the coordinate system of FIG. 19 are used as the x-axis and the y-axis. In the three-dimensional coordinate system of FIG. 20, the symbol $\theta$ of Equation (1) represents an angle defined between a light ray R entering the fish-eye lens 75 and the x-y plane. Furthermore, in Equation (1), the symbol $\phi$ represents an angle defined between a line of the light ray R entering the fish-eye lens 75 projected on the x-y plane and the x-axis. In Equation (1), the angles $\theta$ and $\phi$ are in units of radians.

From Equation (1), tan p is represented by Equation (2).

$$\tan\phi = \dfrac{r_x(y - y_0)}{r_y(x - x_0)} \quad (2)$$

Equation (3) can be derived from Equation (2), by which an angle $\phi$ can be found.

$$\varphi = \tan^{-1} \dfrac{r_x(y - y_0)}{r_y(x - x_0)} \quad (3)$$

To calculate the arctangent ($\tan^{-1}$) of Equation (3), however, it is necessary to take into consideration the quadrant in which the point P is positioned.

Equation (4) can be derived from Equation (1) and Equation (3), by which an angle $\theta$ can be found.

$$\theta = \dfrac{\pi}{2}\left(1 - \sqrt{\dfrac{(x - x_0)^2 + (y - y_0)^2}{r_x^2 + r_y^2}}\right) \quad (4)$$

As an example, a certain pixel of coordinates (x, y) in the pixels that constitute the geometrically-converted image data supplied to the fish-eye projector 73 from the geometrical-conversion/combining unit 44 will be described below. The direction ($\theta$, $\phi$) of a light ray corresponding to this pixel emitted from the fish-eye projector 73 can be derived from Equation (3) and Equation (4).

The light ray corresponding to this certain pixel (referred to as a certain light-ray hereinafter) is reflected by one of the flat mirrors $72_n$ and is directed towards the light-control screen 25. Assuming that a projector $21_n$ is disposed in place of the flat mirror $72_n$, if (the pixel value of) a pixel corresponding to a light ray, among the light rays emitted from the projector $21_n$, is equivalent to (the pixel value of) the certain pixel and the light ray is equivalent to the certain light ray reflected by the flat mirror $72_n$, the light ray emitted by the projector $21_n$ is equivalent to the light ray reflected by the flat mirror $72_n$ and received by light-control screen 25.

The geometrical-conversion/combining unit 44 (see FIG. 17) uses image data captured by each of the cameras $11_1$ to $11_N$ and supplied from the decoder 43 to generate geometrically-converted image data. As described above, assuming that a projector $21_n$ is disposed in place of the flat mirror $72_n$, the geometrically-converted image data generated is equivalent to the image data of which a pixel corresponding to the light ray, among the light rays emitted from the projector $21_n$, is equivalent to the certain pixel and the light ray is equivalent to the certain light ray reflected by the flat mirror $72_n$. The geometrically-converted image data is then supplied to the fish-eye projector 73.

In this case, when the light rays, which correspond to the geometrically-converted data supplied from the geometrical-conversion/combining unit 44, are emitted from the fish-eye projector 73 and are reflected by the flat mirrors $72_n$, the reflected light rays are equivalent to light rays emitted by projectors $21_n$, assuming that the projectors $21_n$ are disposed in place of the flat mirrors $72_n$. This means that the optical display device 20 of FIG. 15 displays an image equivalent to that of the optical display device 20 of FIG. 6.

The optical display device 20 of FIG. 15 has the flat mirrors $72_n$ disposed around the inner side of the support 71. Light rays emitted by the fish-eye projector 73 are reflected by the flat mirrors $72_n$ and are directed toward the light-control screen 25. Other than this structure having the flat mirrors $72_n$ disposed around the inner side of the support 71, the inner side of the support 71 may be formed of, for example, a mirror, by which light rays emitted by the fish-eye projector 73 can be reflected and directed towards the light-control screen 25.

In FIG. 15, although the fish-eye lens 75 is used as the lens for the projector component 74 to emit light rays from the projector component 74 at wide angles, lenses other than the fish-eye lens 75 that emit light rays at wide angles may be alternatively used for the projector component 74.

Figure 21:
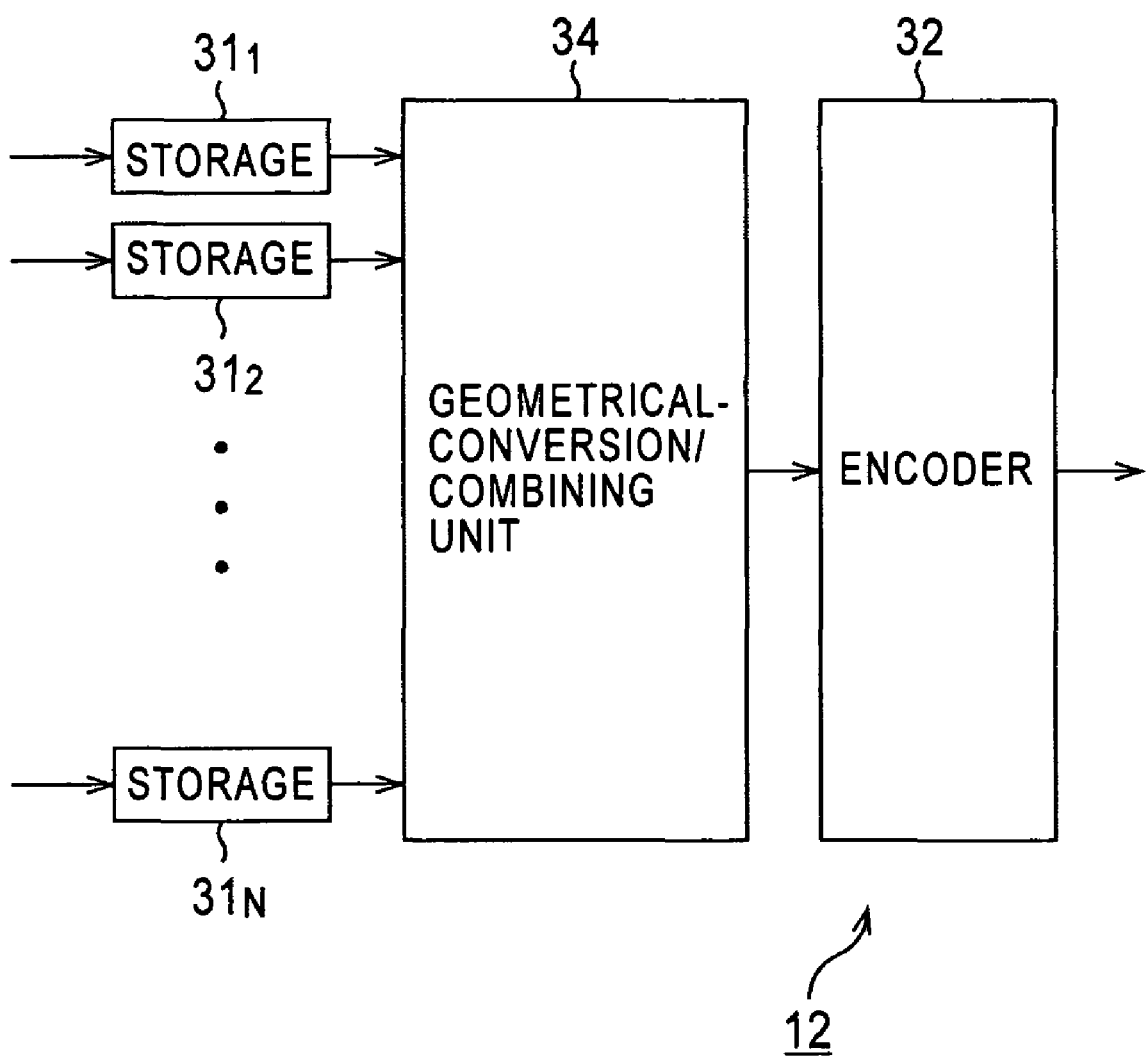
FIG. 21 is a block diagram of an example of a signal processor 12.

FIG. 21 illustrates another example of the signal processor 12 according to the image-capturing apparatus 1 of FIG. 4. In FIG. 21, components that correspond to the components in FIG. 4 are indicated by the same reference numerals, and the description of those components will be omitted where appropriate. Other than having a geometrical-conversion/combining unit 34 and not having the multiplexer 33, the signal processor 12 of FIG. 21 has the same structure as the signal processor 12 of FIG. 4.

From each of the storages $31_1$ to $31_N$, the geometrical-conversion/combining unit 34 reads out image data captured by each of the cameras $11_1$ to $11_N$. The geometrical-conversion/combining unit 34 then uses the image data and performs the same processing as in the geometrical-conversion/combining unit 44 of FIG. 17 so as to generate geometrically-converted image data.

The geometrically-converted image data is then supplied to the encoder 32 from the geometrical-conversion/combining unit 34. The data is encoded in the encoder 32 and is supplied to the display apparatus 2 via the transmission medium 3 or the recording medium 4 (see FIG. 3).

Figure 22:
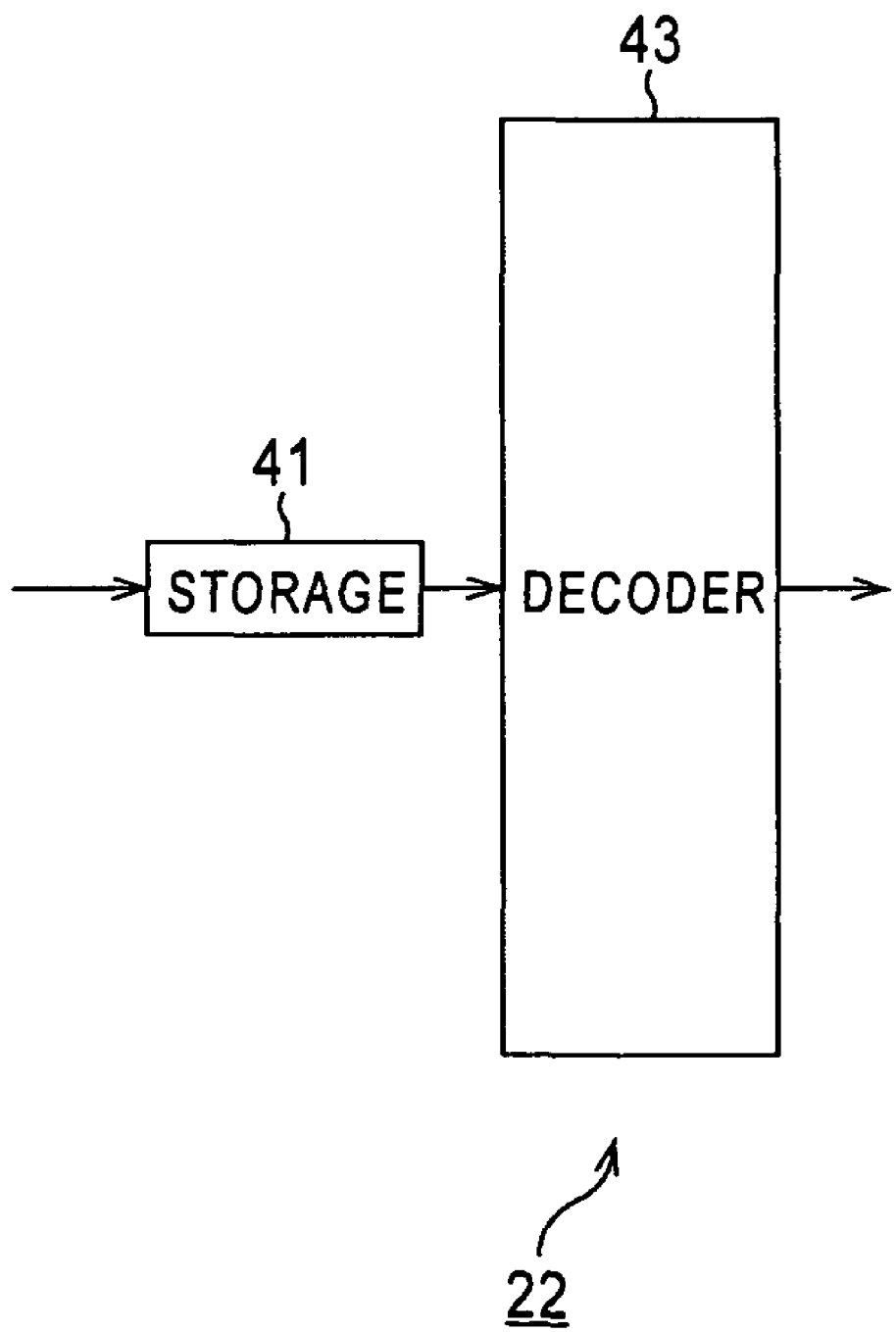
FIG. 22 is a block diagram of another example of the signal processor 22.

FIG. 22 illustrates another example of the signal processor 22 of the display apparatus 2 having the same structure as the signal processor 12 of the image-capturing apparatus 1 shown in FIG. 21. In FIG. 22, components that correspond to the components in FIG. 17 are indicated by the same reference numerals, and the description of those components will be omitted where appropriate. Other than not having the demultiplexer 42 and the geometrical-conversion/combining unit 44, the signal processor 22 of FIG. 22 has the same structure as the signal processor 22 of FIG. 17.

As described above, in the signal processor 12 of FIG. 21, geometrically-converted image data is generated and is then encoded to form encoded data. The encoded data is then supplied to the signal processor 22 of FIG. 22 via the transmission medium 3 or the recording medium 4. In the signal processor 22 of FIG. 22, the encoded data is temporarily stored in the storage 41 and is then decoded to the geometrically-converted data in the decoder 43. The data is then supplied to the fish-eye projector 73 of the optical display device 20 shown in FIG. 15.

Figure 23:
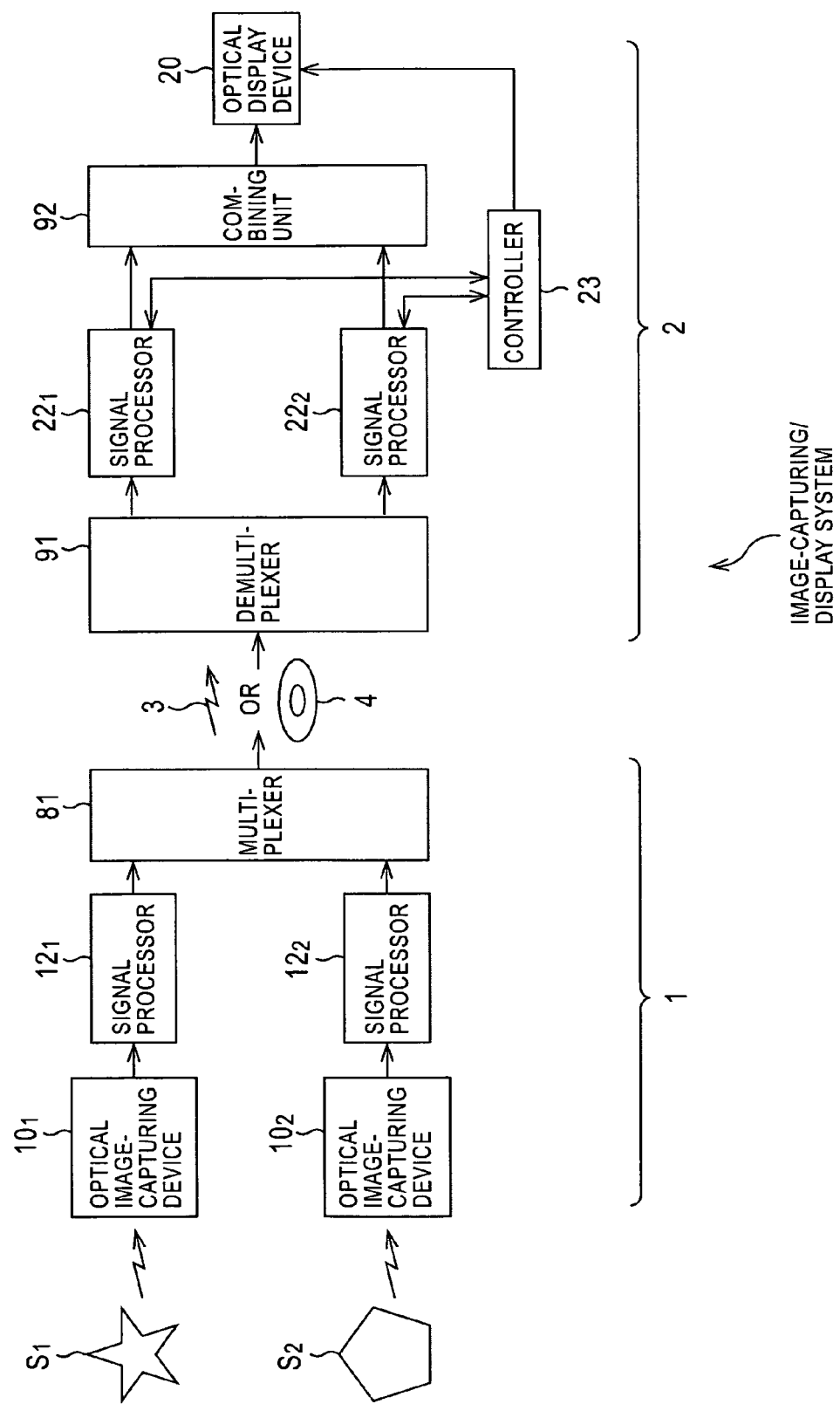
FIG. 23 is a block diagram of a second embodiment of the image-capturing/display system employing the present invention.

FIG. 23 illustrates a second embodiment of the image-capturing/display system employing the present invention. In FIG. 23, components that correspond to the components in FIG. 3, 4, or 6 are indicated by the same reference numerals, and the description of those components will be omitted where appropriate.

In the second embodiment of FIG. 23, the image-capturing apparatus 1 includes two optical image-capturing devices $10_1$ and $10_2$, two signal processors $12_1$ and $12_2$, and a multiplexer 81.

The optical image-capturing devices $10_1$ and $10_2$ each have the same structure as the optical image-capturing device 10 of FIG. 4. The optical image-capturing device $10_1$ captures an image of an object $S_1$ and supplies the obtained image data to the signal processor $12_1$. The optical image-capturing device $10_2$ captures an image of another object $S_2$, different from the object $S_1$, and supplies the obtained image data to the signal processor $12_2$.

Figure 24:
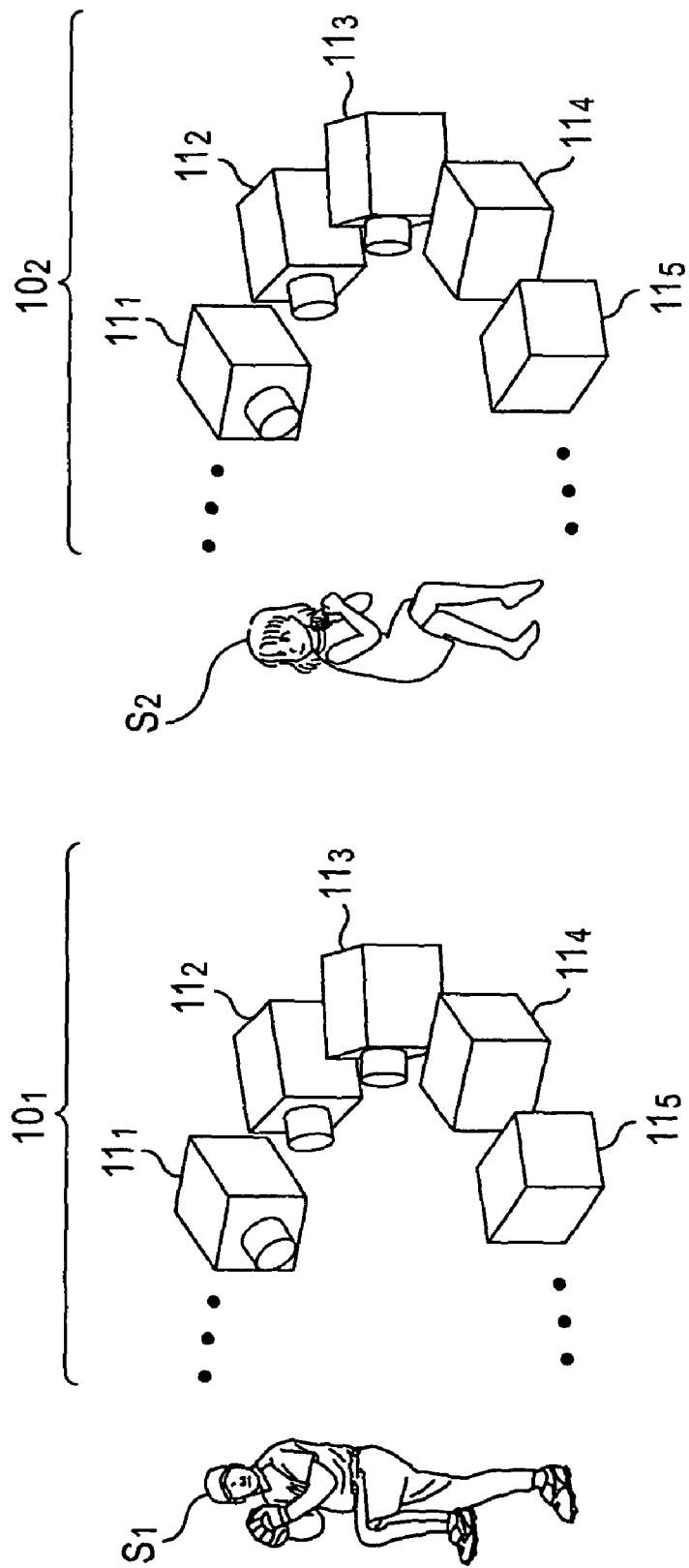
FIG. 24 illustrates optical image-capturing devices $10_1$ and $10_2$, respectively, capturing images of objects $S_1$ and $S_2$.

As is shown in FIG. 24, in the optical image-capturing device $10_1$, multiple cameras disposed around the object $S_1$ (N cameras are provided in the second embodiment, similar to what is shown in FIG. 4) capture images of the object $S_1$. Likewise, in the optical image-capturing device $10_2$, multiple cameras disposed around the object $S_2$ capture images of the object $S_2$.

The signal processors $12_1$ and $12_2$ each have the same structure as the signal processor 12 of FIG. 4. The signal processors $12_1$ and $12_2$ respectively perform the same processing as the signal processor 12 of FIG. 4 on the image data of the objects $S_1$ and $S_2$ supplied from the optical image-capturing devices $10_1$ and $10_2$. The data streams obtained are then supplied to the multiplexer 81.

The two data streams supplied from the signal processors $12_1$ and $12_2$ are multiplexed to form one data stream by the multiplexer 81. The data stream is then supplied to the display apparatus 2 via the transmission medium 3 or the recording medium 4.

Referring to FIG. 23, the display apparatus 2 includes an optical display device 20, two signal processors $22_1$ and $22_1$ a controller 23, a demultiplexer 91, and a combining unit 92. The data stream supplied from (the multiplexer 81 of) the image-capturing apparatus 1 is received by the demultiplexer 91.

The demultiplexer 91 demultiplexes the data stream supplied from the image-capturing apparatus 1 into the two data streams originally obtained in the signal processors $12_1$ and $12_2$. Each of the two data streams is supplied to the corresponding one of the signal processors $22_1$ and $22_2$.

The signal processors $22_1$ and $22_2$ each have the same structure as the signal processor 22 of FIG. 6. The signal processors $22_1$ and $22_2$ perform the same processing as the signal processor 22 of FIG. 6 on the data streams supplied from the demultiplexer 91 and obtained originally in the signal processors $12_1$ and $12_2$. The image data of the objects $S_1$ and $S_2$ obtained are then supplied to the combining unit 92.

The image data of the object $S_1$ supplied from the signal processor $22_1$ and the image data of the object $S_2$ supplied from the signal processor $22_2$ are combined together (superimposed) by the combining unit 92 to generate combined image data. As is shown in FIG. 24, the image data of the objects $S_1$ and $S_2$ supplied from the respective signal processors $22_1$ and $22_2$ are images captured by the multiple cameras disposed around each of the objects $S_1$ and $S_2$. For example, in the combining unit 92, the image data of the object $S_1$ captured from various directions are combined with the image data of the object $S_2$ captured from the same directions as those directions.

In the combining unit 92, it is also possible to combine together the image data of the object $S_1$ captured from various directions and the image data of the object $S_2$ captured from directions different from those directions. In this case, however, the capturing directions of the image data of the combined objects $S_1$ and $S_2$ must be separated by equal angles (equal phases).

Figure 25:
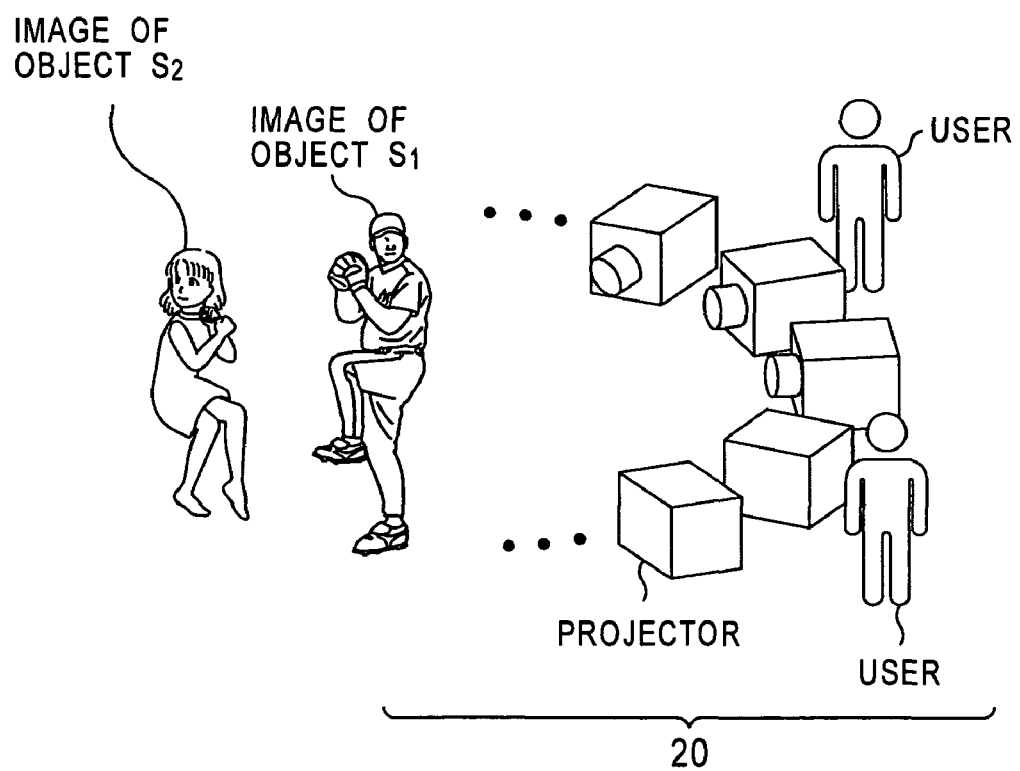
FIG. 25 illustrates an optical display device 20 displaying a combination of the images of the objects $S_1$ and $S_2$.

The combined image data obtained in the combining unit 92 is supplied to the optical display device 20 and is displayed in the optical display device 20 in the same manner as is displayed in the optical display device 20 of FIG. 6. Accordingly, as is shown in FIG. 25, the optical display device 20 of FIG. 23 displays a combined image of the object $S_1$ and the object $S_2$.

For example, in the image-capturing/display system of FIG. 23, if image data capturing a practice swing of a professional golfer is used as the image data of the object $S_1$ and image data capturing a practice swing of a user is used as the image data of the object $S_2$, the optical display device 20 displays the combination of the two image data. This enables the user to check in detail the difference between the swings of the user and the professional golfer.

In this embodiment of FIG. 23, the two image data obtained in the optical image-capturing devices $10_1$ and $10_2$ of the image-capturing apparatus 1 are multiplexed to form one data stream by the multiplexer 81, and the data stream is supplied to the display apparatus 2. It is also possible to provide multiple image-capturing apparatuses, each having the same structure as the image-capturing apparatus 1 of FIG. 4, in an area remote from the display apparatus 2. Image data are thus sent to the display apparatus 2 of FIG. 23 from each image-capturing apparatus. In this case, the display apparatus 2 of FIG. 23 does not need the demultiplexer 91. It is necessary, however, to provide for the display apparatus 2 an equal number of signal processors, which are equivalent to the signal processors 22, as the number of the image-capturing apparatuses provided.

In this embodiment of FIG. 23, although the image data of the objects $S_1$ and $S_2$ are simply combined in the combining unit 92, the combining unit 92 may also combine the image data of the objects $S_1$ and $S_2$ according to their positional relationships and their scale variations. Furthermore, the combining unit 92 may, for example, combine the image data of the objects $S_1$ and $S_2$ while shifting the position of one of or both of the image data of the objects $S_1$ and $S_2$.

Figure 26:
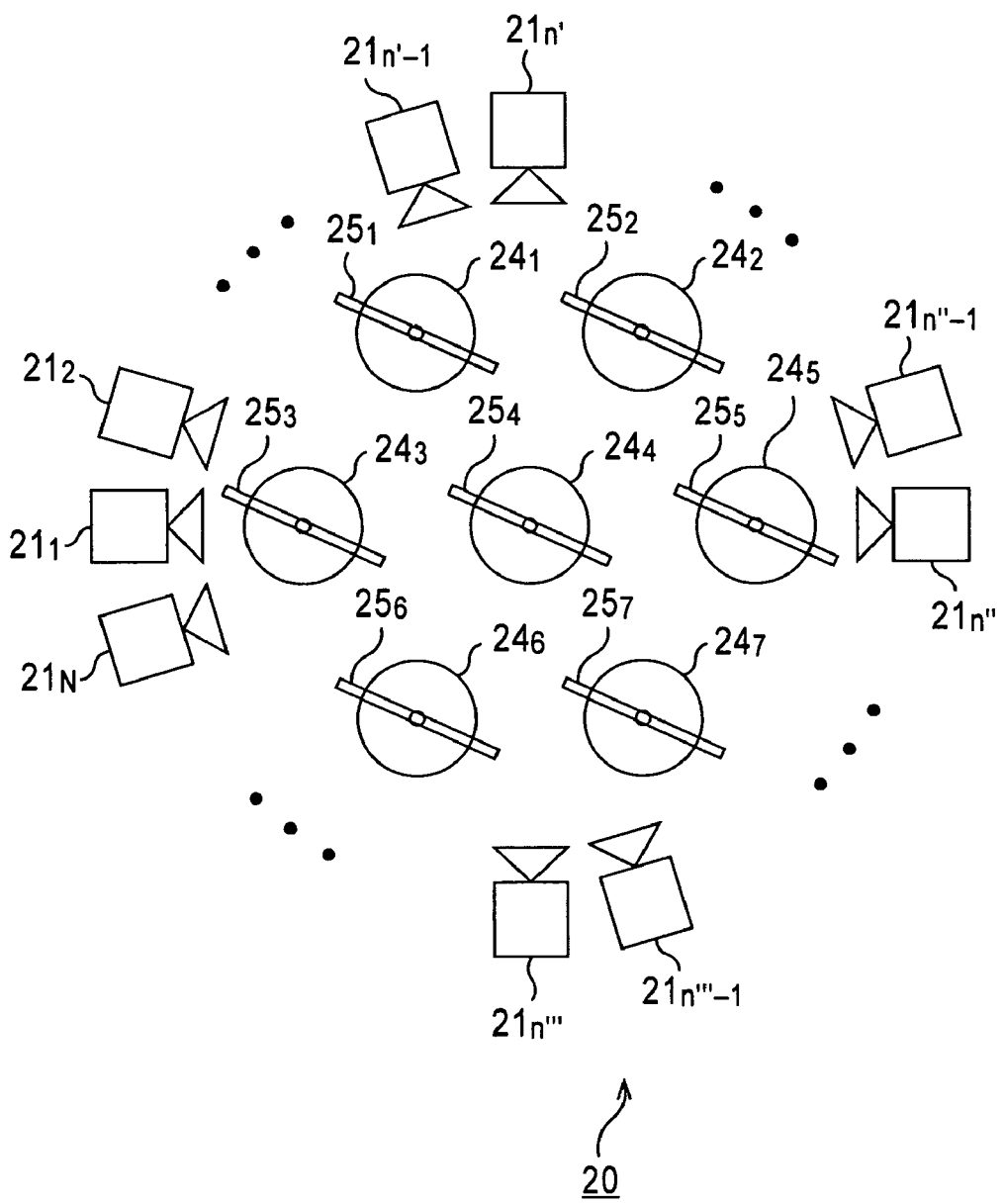
FIG. 26 is a plan view of another example of the optical display device 20.

FIG. 26 illustrates another example of the optical display device 20 of FIG. 6. In FIG. 26, components that correspond to the components in FIG. 6 are indicated by the same reference numerals, and the description of those components will be omitted where appropriate. Other than having, for example, seven sets of drivers $24_1$ to $24_7$ and light-control screens $25_1$ to $25_7$ in place of the one set of the driver 24 and the light-control screen 25 of FIG. 6, the optical display device 20 of FIG. 26 has the same structure as the optical display device 20 of FIG. 6.

The drivers $24_1$ to $24_7$ are controlled by a controller 23 (see FIG. 6) and accordingly rotate the light-control screens $25_1$ to $25_7$, for example, in phase and at the same angular rate. This means that when the forward direction of a light-control screen $25_j$ (j=1, 2, . . . , 7) of the light-control screens $25_1$ to $25_7$ is aligned in parallel with the optical axis of one of the projectors $21_n$, the forward directions of other light-control screens $25_{j'}$ (j=1, 2, . . . , 7: j~j') are also aligned in parallel with the optical axis of that projector $21_n$.

The drivers $24_1$ to $24_7$ and the light-control screens $25_1$ to $25_7$ are disposed such that when the light-control screens $25_1$ to $25_7$ are viewed from one of the projectors $21_n$ positioned in the front direction of the screens, the ends of at least three screens overlap one another to define one screen having a size equivalent to at least three screens arranged side by side horizontally.

Accordingly, with the optical display device 20 of FIG. 26, even if each of the light-control screens $25_1$ to $25_7$ is small in size, the large screen defined by the light-control screens $25_1$ to $25_7$ can display a large image.

According to a test performed by the inventors of the present invention, it was possible to rotate an A5-sized screen having a rotational axis along its longitudinal axis at about 8 Hz using a commercially-available motor.

The series of operations described above may be performed using hardware or software. If software is used for this series of operations, a software program is installed in, for example, a general-purpose computer.

Figure 27:
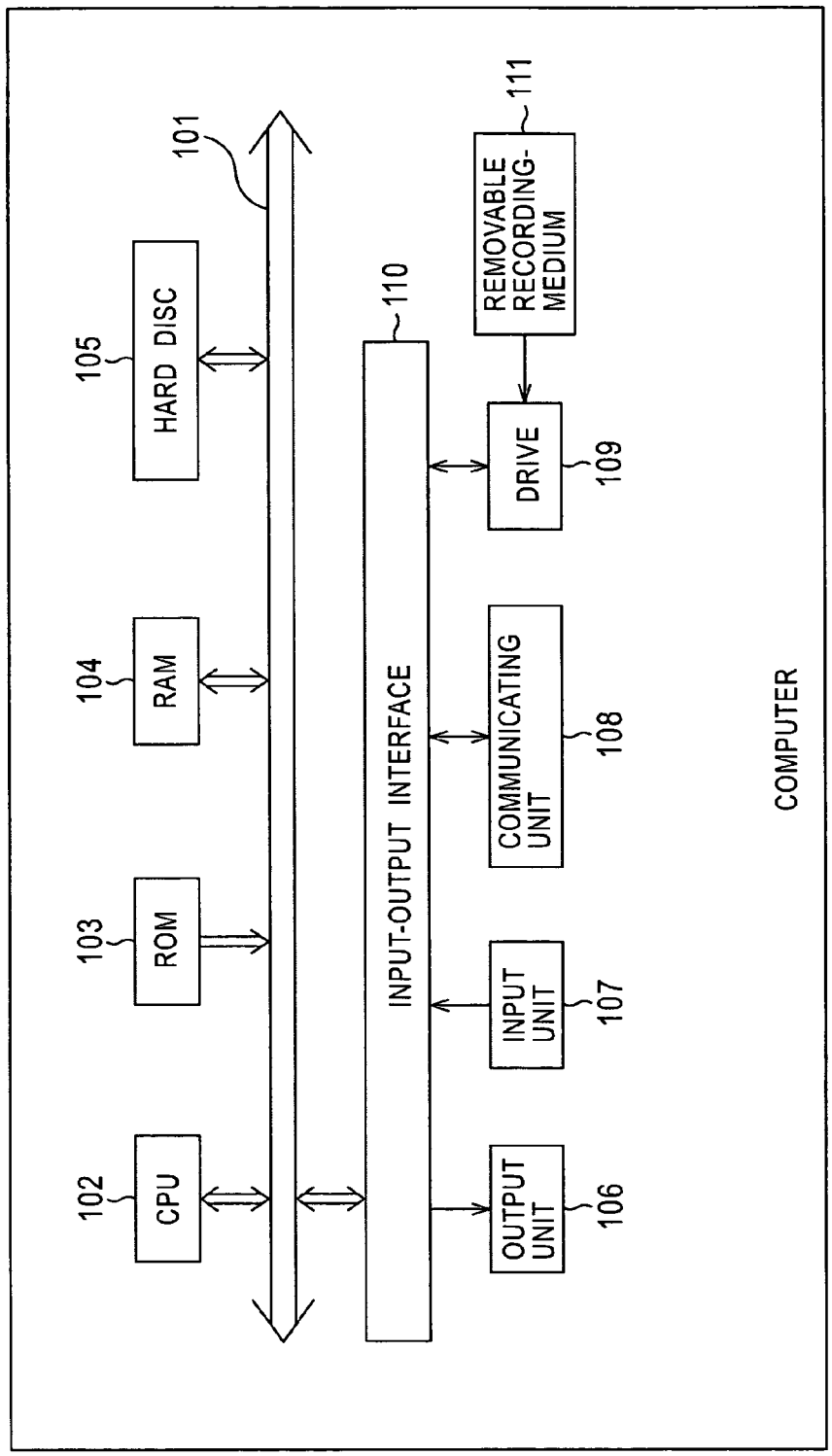
FIG. 27 is a block diagram of an embodiment of a computer employing the present invention.

FIG. 27 illustrates an embodiment of a computer in which the program for running the series of operations is installed.

The program may be preliminarily written onto a recording medium, such as a hard disc 105 and a ROM 103, built inside the computer.

Alternatively, the program may be temporarily or permanently stored in (written onto) a removable recording-medium 111 such as a floppy disc, a CD-ROM (Compact Disc Read Only Memory), an MO (Magneto Optical) disc, a DVD (Digital Versatile Disc), a magnetic disc, and a semiconductor memory. The removable recording-medium 111 of this type may be distributed as packaged software.

Other than installing the program in the computer from the removable recording-medium 111, the program may be transferred to the computer from a download site by radio via satellite for Digital Satellite Broadcasting, or may be transferred to the computer by wire via a network such as a LAN (Local Area Network) and the Internet. The transferred program is thus received by a communicating unit 108 in the computer and is installed in an internal hard disc 105.

The computer includes a built-in CPU (Computer Processing Unit) $10_2$. The CPU $10_2$ is connected to an input-output interface 110 via a bus $10_1$. When a user, for example, operates an input unit 107, such as a keyboard, a mouse, and a microphone, so as to input a command to the CPU 102 via the input-output interface 110, a program stored in the ROM (Read Only Memory) 103 is executed. Alternatively, a program stored in the hard disc 105; a program that is transferred via satellite or network, received by the communicating unit 108, and installed in the hard disc 105; or a program that is read out from the removable recording-medium 111 mounted on a drive 109 and installed in the hard disc 105 may be loaded onto a RAM (Random Access Memory) 104 so that the program is executed by the CPU 102. Consequently, the CPU 102 performs the operation according to the flow charts described previously, or the operation according to the block diagrams described previously. According to need, for example, the CPU 102 outputs the result of the operation from an output unit 106, such as an LCD (Liquid Crystal Display) and a speaker, via the input-output interface 110. Alternatively, the result of the operation may be transmitted via the communicating unit 108, or may be, for example, written onto the hard disc 105.

In this description, the steps describing the program for the computer to perform each operation do not necessarily need to be performed in the time order of the flow charts described above. The steps may be performed in parallel or individually (for example, by parallel processing or by object-oriented processing).

The program may be either operated with one computer or operated with multiple computers in a distributed manner. Furthermore, the program may be transferred to a remote computer so as to be executed in that computer.

FIG. 28A to FIG. 28D illustrate the differences among the image-capturing/display system of FIGS. 3 and 23, the IP 3D-image system, and Zebra Imaging.

Figure 28A:
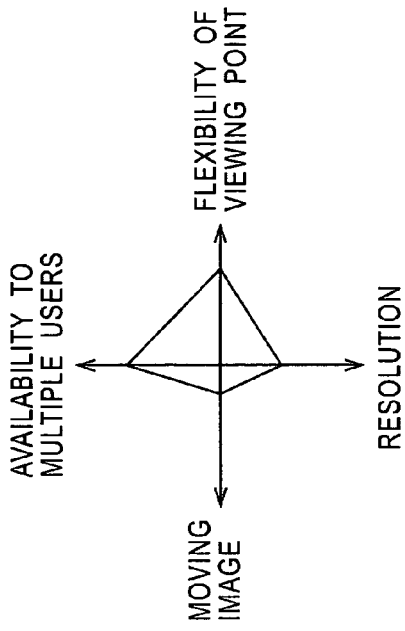
FIG. 28A illustrates a result of comparing the image-capturing/display system employing the present invention with the IP 3D-image system and Zebra Imaging.

As shown in FIG. 28A, the IP 3D-image system is capable of displaying images viewable from various viewing points of multiple users and does not have problems with displaying moving images. Furthermore, the IP 3D-image system is highly flexible in providing various viewing points for the users. However, as described previously, the IP 3D-image system has difficulties in providing images having high resolution.

Figure 28B:
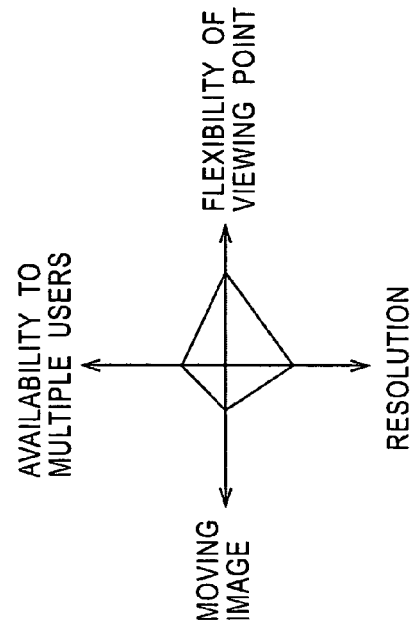
FIG. 28B illustrates another result of comparing the image-capturing/display system employing the present invention with the IP 3D-image system and Zebra Imaging.

As shown in FIG. 28B, Zebra Imaging is capable of displaying images viewable from various viewing points of multiple users and can display images having high resolution. Furthermore, Zebra Imaging is highly flexible in providing various viewing points for the users, like the IP 3D-image system. However, as described previously, Zebra Imaging has difficulties in providing moving images.

Figure 28C:
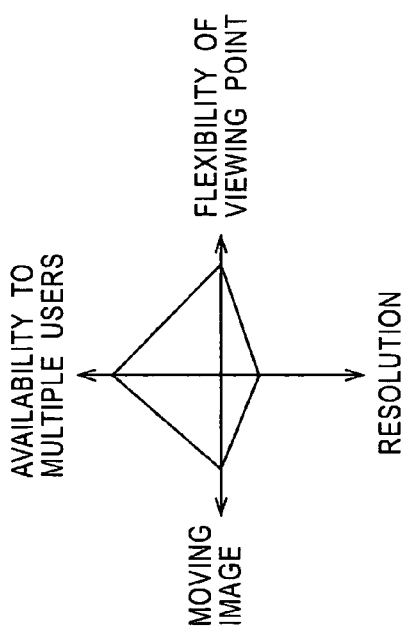
FIG. 28C illustrates another result of comparing the image-capturing/display system employing the present invention with the IP 3D-image system and Zebra Imaging.

On the other hand, as is shown in FIG. 28C, although the flexibility of viewing points for users in the image-capturing/display system of FIGS. 3 and 23 is not as high as the flexibility of the IP 3D-image system and Zebra Imaging, the image-capturing/display system is still capable of displaying images viewable from various viewing points of multiple users. Furthermore, the image-capturing/display system can display images having high resolution and does not have problems with displaying moving images.

Figure 28D:
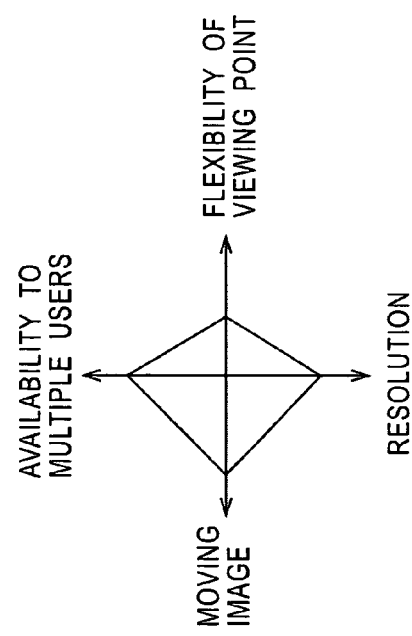
FIG. 28D illustrates another result of comparing the image-capturing/display system employing the present invention with the IP 3D-image system and Zebra Imaging.

The applicant of the present invention has previously disclosed a method that uses optical paths of light rays of captured image data of an object, and information of the light rays, that is, pixel values corresponding to the light rays, so as to convert image data of an object into image data of the object viewable from a viewing point of a user (Japanese Patent Application No. 2002-161838). With this method, when the user relocates the viewing point to look at an image of an object displayed on a display, the image data displayed is equivalent to what the user visually perceives when the object is seen from the relocated viewing point in reality. In other words, the image data displayed on the screen exhibits the part of the object at which the user looks, and for this reason, a display of this type is called a "multi-view television" (a multiple-viewing-point image-displaying TV). As is shown in FIG. 28D, this "multi-view television" can display high-resolution images and is also highly flexible in providing various viewing points for users. However, because the "multi-view television" has only one display face, it is difficult to provide images viewable from various viewing points of multiple users.

Although the light-control screen 25 is formed of a single screen in the above embodiments, the light-control screen 25 may be alternatively formed of, for example, three screens having the same structure as the light-control screen 25 of FIG. 12. In this case, the three screens are connected together to form a triangular prism such that each of the display faces of the three screens faces outward. An axis extending through the center of the triangle in the bottom surface of the triangular prism may, for example, function as the rotational axis around or on which the prism may be rotated.

INDUSTRIAL APPLICABILITY

According to the present invention, high-resolution moving images can be viewed from various viewing points of multiple users.

The invention claimed is:

1. A display apparatus comprising:
    a double faced screen which receives light rays to display moving images, corresponding to the light rays, independently on two faces;
    driving means for rotating the screen around or on a predetermined rotational axis thereof; and
    irradiating means for irradiating the screen with the light rays, corresponding to the images, from various directions;
    wherein the screen comprises:
        a blocking plate;
        two diffusing plates, formed on the blocking plate to sandwich the blocking plate therebetween, each diffusing plate for diffusing and displaying the light rays received from the irradiating means; and
        two optical filter films, each formed on one of the diffusing plates, each optical filter film having a flat top surface and an internal structure of multiple fine rectangular film components fixedly formed along a vertical direction of the screen parallel to the rotational axis to form slits, a direction of the slits being a forward direction which is perpendicular to the flat top surface of the optical filter film, the slits (a) directly transmits the light rays traveling only in the forward direction from the irradiating means to the diffusing plate, and (b) blocks the diffused light rays from the diffusing plate not transmitted in the forward direction by reducing light intensity of the light rays, wherein an image of an object is viewed by a user as if the object is seen by an image taking unit only when (1) a corresponding irradiating means is in front of one of the display faces of the screen and (2) the user is positioned at the forward direction of that display face.

2. The display apparatus according to claim 1, wherein the irradiating means comprises a plurality of light-emitting means for emitting the light rays corresponding to the images, the plurality of light-emitting means surrounding the rotational axis of the screen and being disposed within the same plane.

3. The display apparatus according to claim 2, wherein the plurality of light-emitting means are disposed such that optical axes of the light-emitting means converge at one point on the rotational axis of the screen.

4. The display apparatus according to claim 1, wherein the irradiating means comprises:
    wide-angle light-emitting means for emitting the light rays corresponding to the images at wide angles; and
    reflecting means for reflecting the light rays emitted from the wide-angle light-emitting means toward the screen.

5. The display apparatus according to claim 1, wherein the irradiating means irradiates the screen with the light rays corresponding to the images of the object captured by a plurality of image-capturing means for capturing images of an object, the plurality of image-capturing means surrounding the object and being disposed within the same plane.

6. The display apparatus according to claim 5, wherein the irradiating means irradiates the screen with the light rays corresponding to the images, the light rays being released from the various directions that correspond to positions of the plurality of light-capturing means with respect to the object.

7. The display apparatus according to claim 6, wherein the irradiating means comprises a plurality of light-emitting means for emitting the light rays corresponding to the images of the object captured by the plurality of image-capturing means.

8. The display apparatus according to claim 7, wherein the plurality of light-emitting means are disposed such that the positional relationships of the optical axes of the light-emitting means are similar to the positional relationships of the optical axes of the plurality of light-capturing means.

9. The display apparatus according to claim 5, wherein irradiating means comprises:
    wide-angle light-emitting means for emitting the light rays corresponding to the images at wide angles;
    reflecting means for reflecting the light rays emitted from the wide-angle light-emitting means toward the screen; and
    converting means for converting the images of the object captured by the plurality of image-capturing means into images to be displayed on the screen such that the captured images are equivalent to the display images, the displayed images being displayed on the screen when the light rays reflected by the reflecting means are received by the screen,
    wherein the wide-angle light-emitting means emits the light rays corresponding to the images converted by the converting means.

10. The display apparatus according to claim 5, further comprising:
    combining means for combining images each captured by at least two sets of the plurality of image-capturing means, and for outputting the combined image,
    wherein the irradiating means irradiates the screen with light rays corresponding to the combined image.

11. The display apparatus according to claim 5, further comprising the plurality of image-capturing means.

12. The display apparatus according to claim 1, wherein the screen receives light rays entering only from a predetermined direction and diffuses the light rays to display the images.

13. The display apparatus according to claim 1, wherein the screen receives and diffuses the light rays to display the images and projects only a portion of the light rays corresponding to the images, the portion of the light rays traveling in a predetermined direction.

14. The display apparatus according to claim 1, wherein the driving means rotates the screen according to the number of directions from which the light rays are emitted toward the screen by the irradiating means, and according to the frequency of irradiation of the irradiating means.

15. A display method comprising the steps of:
rotating a double faced screen around or on a predetermined rotational axis thereof, the screen receiving light rays to display moving images, corresponding to the light rays, independently on the two faces; and
irradiating the screen with light rays corresponding to the images from various directions by directly transmitting the light rays traveling only in a forward directions through an optical filter film, the forward direction being perpendicular to a flat top surface of the optical filter film, wherein the optical filter film having the flat top surface and an internal structure of multiple fine rectangular film components fixedly formed along a vertical direction of the screen parallel to the rotational axis, the multiple fine rectangular film components forming slits, a direction of the slits being the forward direction;
diffusing the received light rays by a diffusing plate after being transmitted through the optical filter film;
transmitting the light rays diffused by the diffusing plate in the diffusing step only in the forward direction by the optical filter film and blocking the diffused light rays from the diffusing plate not transmitted in the forward direction by the optical filter film by reducing light intensity of the light rays; and
blocking the light rays diffused in a backward direction by a blocking plate, wherein an image of an object is viewed by a user as if the object is seen by an image taking unit only when (1) a corresponding irradiating means is in front of one of the display faces of the screen and (2) the user is positioned at the forward direction of that display face.

* * * * *